US011864044B2

(12) United States Patent
Xu et al.

(10) Patent No.: US 11,864,044 B2
(45) Date of Patent: Jan. 2, 2024

(54) WIRELESS COMMUNICATION METHOD AND COMMUNICATION DEVICE

(71) Applicant: HUAWEI TECHNOLOGIES CO., LTD., Shenzhen (CN)

(72) Inventors: Shengfeng Xu, Beijing (CN); Yanmei Yang, Beijing (CN); Ruiyue Xu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 214 days.

(21) Appl. No.: 17/386,949

(22) Filed: Jul. 28, 2021

(65) Prior Publication Data
US 2021/0377837 A1 Dec. 2, 2021

Related U.S. Application Data

(63) Continuation of application No. PCT/CN2020/071736, filed on Jan. 13, 2020.

(30) Foreign Application Priority Data

Jan. 29, 2019 (CN) .......................... 201910087482.1

(51) Int. Cl.
H04W 4/00 (2018.01)
H04W 36/14 (2009.01)
(Continued)

(52) U.S. Cl.
CPC ........... H04W 36/14 (2013.01); H04W 24/04 (2013.01); H04W 36/32 (2013.01)

(58) Field of Classification Search
CPC ...... H04W 36/14; H04W 24/04; H04W 36/32
See application file for complete search history.

(56) References Cited

U.S. PATENT DOCUMENTS 7,009,555 B2 3/2006 Tsujimoto et al.
2016/0035224 A1 2/2016 Yang et al.
(Continued)

FOREIGN PATENT DOCUMENTS

CN 104081831 A 10/2014
CN 105262784 A 1/2016
(Continued)

OTHER PUBLICATIONS

China Telecom, Discussions on OAM for gNB-CU and gNB-DU, 3GPP TSG-RAN WG3 NR AdHoc, Qingdao, China, Jun. 27-29, 2017, R3-172267, 2 pages.
(Continued)

Primary Examiner — Justin Y Lee
(74) Attorney, Agent, or Firm — Maier & Maier, PLLC

(57) ABSTRACT

A wireless communication method and a communication device. The method includes: a first management device receives a communication coverage request message from a second management device, where the communication coverage request message includes at least one of the following communication parameter information: communication coverage area information and communication service requirement information; the first management device determines at least one target access network based on the communication parameter information; and the first management device sends a first configuration message to the target access network, where the first configuration message is used to indicate the target access network to provide communication coverage. This can reduce a waste of energy and resources.

16 Claims, 8 Drawing Sheets

(51) Int. Cl.
H04W 24/04 (2009.01)
H04W 36/32 (2009.01)

(56) References Cited

U.S. PATENT DOCUMENTS

| | | | |
|---|---|---|---|
| 2016/0269496 A1* | 9/2016 | Lidin | H04M 3/42263 |
| 2017/0171761 A1 | 6/2017 | Guvenc | |
| 2018/0247544 A1 | 8/2018 | Mustafic et al. | |
| 2019/0037468 A1* | 1/2019 | Bongaarts | H04W 36/32 |

FOREIGN PATENT DOCUMENTS

| | | |
|---|---|---|
| CN | 106797343 A | 5/2017 |
| CN | 108064465 A | 5/2018 |
| CN | 108401438 A | 8/2018 |
| CN | 108901038 A | 11/2018 |

OTHER PUBLICATIONS

Huawei, ID_UAS-enhancement on initial UAV authorization operation, 3GPP TSG-SA WG1 Meeting #83, West Palm Beach, Aug. 20-24, 2018, S1-182199, 3 pages.

Kim et al., "A Toolkit for Construction of Authorization Service Infrastructure for the Internet of Things", Proceedings of the Second International Conference on Internet-of-Things Design and Implementation, IoTDI, Apr. 17, 2017, pp. 147-158.

\* cited by examiner

| Message type field | Message purpose field | Terminal type field | Terminal identifier field | Moving area field | Moving time field | Trajectory field | Communication requirement field |
FIG. 5
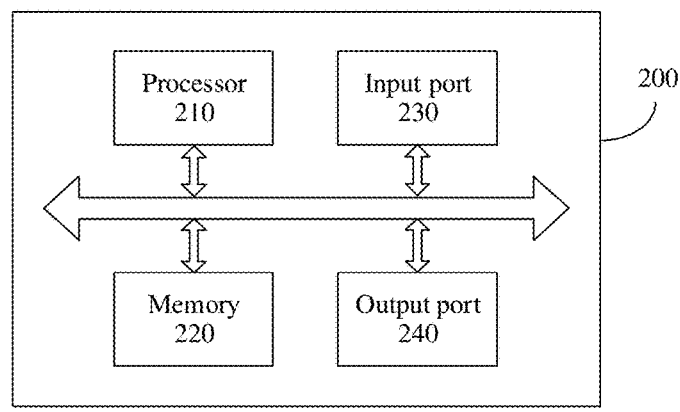
FIG. 6
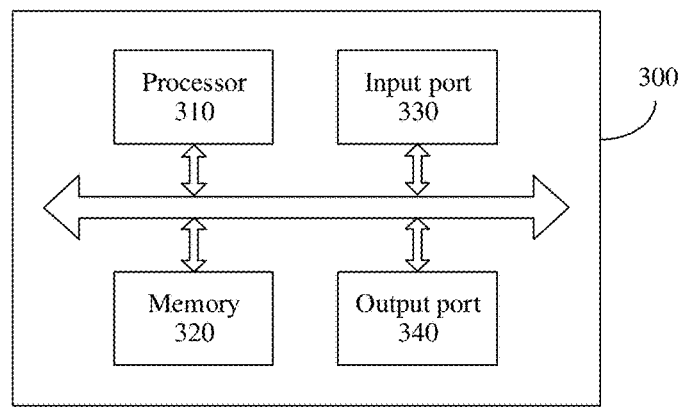
FIG. 7

WIRELESS COMMUNICATION METHOD AND COMMUNICATION DEVICE

CROSS-REFERENCE TO RELATED APPLICATIONS

This application is a continuation of International Application No. PCT/CN2020/071736, filed on Jan. 13, 2020. The International Application claims priority to Chinese Patent Application No. 201910087482.1, filed on Jan. 29, 2019. The afore-mentioned patent applications are hereby incorporated by reference in their entireties.

TECHNICAL FIELD

The embodiments relate to the communication field, and more specifically, to a wireless communication method and a communication device in the communication field.

BACKGROUND

An unmanned aerial vehicle (UAV) for short, is an unmanned aircraft with autonomous power. The UAV can be manually operated or autonomously driven to perform various tasks. As R&D technologies of the UAV become mature, manufacturing costs are greatly reduced, and the UAV is widely used in various fields, including agricultural plant protection, electric power inspection, police law enforcement, geological exploration, environmental monitoring, forest fire prevention, aerial photography for movies and television, and the like. The UAV is an important part of terminals for connectivity of everything in the future, and the UAV is developing toward intelligent flight, broadband transmission, and diversified functions. Based on this, to adapt to the future development trend of the UAV, a communication network that matches the development trend of the UAV is required to ensure corresponding network coverage.

A mobile network (for example, a mobile cellular network) has advantages such as a wide coverage range, a large system capacity, support to a large variety of service types, and strong anti-interference performance, and features such as a plurality of high-precision positioning technologies. Therefore, the mobile communication network can provide air coverage for communication and management and control of the UAV.

In a possible implementation, an air coverage capability is enabled all the time on a base station. However, for an air communication requirement of low-density UAVs, if the air coverage capability is enabled all the time on all millions of base stations, a waste of energy and wireless transmission resources is caused, and interference may be caused to a terminal device on the ground.

Therefore, a technology is urgently needed to reduce the waste of energy and resources while meeting an air coverage requirement of the UAV.

SUMMARY

The embodiments provide a wireless communication method and a communication device, to reduce a waste of energy and resources.

According to a first aspect, a wireless communication method is provided. The method includes: A first management device receives a communication coverage request message from a second management device, where the communication coverage request message includes at least one of the following communication parameter information: communication coverage area information and communication service requirement information; the first management device determines at least one target access network based on the communication parameter information; and the first management device sends a first configuration message to the target access network, where the first configuration message is used to indicate the target access network to provide communication coverage.

According to the solution provided in the embodiments, a terminal device reports the communication parameter information, and a management device determines, based on the communication parameter information, the target access network that needs to provide a communication service for the terminal device, and controls the target access network to enable a communication coverage function. This can avoid a waste of resources.

That "the first configuration message is used to indicate the target access network to provide communication coverage" may be understood as: The first configuration message is used to indicate the target access network to provide the network coverage for a first communication service.

That is, the first communication service may be understood as a service corresponding to the communication coverage (for example, a service that needs to be covered by the communication) provided by the target access network.

In other words, the first communication service may be understood as a service corresponding to the communication coverage requested by a communication request message or the communication coverage request message.

In addition, the first configuration message may include information about the first communication service.

Alternatively, the first communication service may be a communication service corresponding to the communication parameter information.

Alternatively, the first communication service may be a predefined communication service.

For example, the first communication service may include an UAV service, a driverless car service, and the like.

Optionally, the communication coverage area information may be used to indicate at least one passing point on a trajectory of the terminal device.

In other words, the communication coverage area information is used to indicate a network coverage range.

Optionally, the communication coverage request message may be used to indicate a target area for which the communication coverage needs to be provided.

Optionally, the communication coverage requested by the communication coverage request message may be air communication coverage.

Optionally, the first management device may include a manufacturer-oriented management device.

Optionally, the second management device may include an operator-oriented management device.

According to the solution provided in the embodiments, the terminal device reports the communication parameter information, and the management device determines, based on the communication parameter information, the target access network that needs to provide a communication service for the terminal device, and controls the target access network to enable the communication coverage function. This can avoid the waste of resources.

For example, the terminal device may include an UAV.

Optionally, the first management device may include an element management system (EMS) device, and the second management device includes a network management system (NMS) device.

Optionally, a third device may include an UAV control function (UCF) device or an UAV server.

The UAV server is a device that provides an application service for the terminal in this embodiment. The UAV server may be considered as an application network element in a 5G mobile communication network, or may be located in a data network and communicate with the UAV. The UAV server may be a function module (for example, third-party UAV cloud) in UAV traffic management (UTM), and supports functions such as registration, flight plan approval, flight operation authorization, flight monitoring, and flight control of the UAV. Alternatively, the UAV server may be an UAV supervision server. The UAV server may alternatively be an UAV application server, and supports control and management of an UAV application service, for example, UAV data collection and video data management.

Optionally, the communication coverage area information may be used to determine an area for which the communication coverage needs to be provided.

Optionally, the communication coverage area information may include information about at least one of the following parameters: a moving range of the terminal device, a destination of the terminal device, a place of departure of the terminal device, a trajectory of the terminal device, a moving speed and direction of the terminal device, or a current position of the terminal device.

Optionally, that the first management device determines at least one target access network based on the communication parameter information may include: The first management device obtains first network information, where the first network information is used to indicate an access network corresponding to at least one geographical area; and the first management device determines the at least one target access network based on the first network information and the communication parameter information.

That the first network information is used to indicate an access network corresponding to at least one geographical area may be understood as follows: The first network information is used to indicate an access network set corresponding to each of a plurality of geographical areas, each access network set includes at least one access network, and all coverage ranges of access networks in an access network set corresponding to a geographical area belong to the geographical area, or all coverage ranges of access networks in an access network set corresponding to a geographical area overlap the geographical area.

Alternatively, that the first network information is used to indicate an access network corresponding to at least one geographical area may be understood as follows: The first network information is used to indicate a geographical area covered by each of a plurality of access networks.

Optionally, the communication service requirement information may include but is not limited to at least one of the following information: indication information of air communication, indication information of an uplink communication rate, indication information of a downlink communication rate, or indication information of a communication delay.

Optionally, the method may further include: The first management device determines, based on the communication parameter information, a radio parameter corresponding to the communication coverage of the target access network; and the first management device sends a second configuration message to the target access network, where the second configuration message is used to indicate the radio parameter.

Optionally, the communication parameter information may further include communication time information, and the method may further include: The first management device determines, based on the communication parameter information, communication time corresponding to the communication coverage of the target access network; and the first management device sends a third configuration message to the target access network, where the third configuration message is used to indicate the communication time.

Optionally, the communication time information may include information about at least one of the following parameters: the moving range of the terminal device, the destination of the terminal device, the place of departure of the terminal device, the trajectory of the terminal device, the moving speed and direction of the terminal device, the current position of the terminal device, or moving time of the terminal device.

The moving time of the terminal device may include time (or in other words, a time period) at which the terminal device passes by each target network.

Optionally, the first configuration message, the second configuration message, and the third configuration message may be carried in a same message.

In other words, the first configuration message, the second configuration message, and the third configuration message are synchronously sent.

Optionally, the first configuration message, the second configuration message, and the third configuration message may be carried in different messages.

In other words, the first configuration message, the second configuration message, and the third configuration message are asynchronously sent.

According to a second aspect, a wireless communication method is provided. The method may include: A second management device receives a communication coverage request message from a third device, where the communication coverage request message includes at least one of the following communication parameter information: communication coverage area information and communication service requirement information; and the second management device forwards the communication coverage request message to a first management device.

According to the solution provided in the embodiments, a terminal device reports the communication parameter information, and a management device determines, based on the communication parameter information, a target access network that needs to provide a communication service for the terminal device, and controls the target access network to enable a communication coverage function. This can avoid a waste of resources.

Optionally, the terminal device may include an UAV.

Optionally, the first management device may include a manufacturer-oriented management device.

Optionally, the second management device may include an operator-oriented management device.

Optionally, the first management device may include an element management system EMS device, and the second management device includes a network management system NMS device.

Optionally, a third device may include an UAV control function UCF device or an UAV server.

The UAV server is a device that provides an application service for the terminal in this embodiment. The UAV server may be considered as an application network element in a 5G mobile communication network, or may be located in a data network and communicate with the UAV. The UAV server may be a function module (for example, third-party UAV cloud) in UTM, and supports functions such as registration, flight plan approval, flight operation authorization, flight monitoring, and flight control of the UAV. Alternatively, the UAV server may be an UAV supervision server. The UAV server may alternatively be an UAV application server, and supports control and management of an UAV application service, for example, UAV data collection and video data management.

Optionally, the communication coverage area information may be used to indicate a target area for which the communication coverage needs to be provided.

Optionally, the communication coverage requested by the communication coverage request message may be air communication coverage.

Optionally, the communication coverage area information may include information about at least one of the following parameters: a moving range of the terminal device, a destination of the terminal device, a place of departure of the terminal device, a trajectory of the terminal device, a moving speed and direction of the terminal device, or a current position of the terminal device.

Optionally, the communication service requirement information may include, but is not limited to, at least one of the following information: indication information of air communication, indication information of an uplink communication rate, indication information of a downlink communication rate, or indication information of a communication delay.

Optionally, the communication parameter information may further include communication time information. The communication time information may be used to determine time at which the communication coverage needs to be provided.

Optionally, the communication time information may include information about at least one of the following parameters: the moving range of the terminal device that accesses a first communication service, the destination of the terminal device, the place of departure of the terminal device, the trajectory of the terminal device, the moving speed and direction of the terminal device or a current position of the terminal device, the communication rate expected by the terminal device, the communication delay expected by the terminal device, or the moving time of the terminal device.

The moving time of the terminal device may include time (or in other words, a time period) at which the terminal device passes by each target network.

According to a third aspect, a wireless communication method is provided. The method may include: A third device receives a communication request message, where the communication request message includes at least one of the following parameters: a moving range of a terminal device, a destination of the terminal device, a place of departure of the terminal device, a trajectory of the terminal device, a moving speed and direction of the terminal device or a current position of the terminal device, a communication rate expected by the terminal device, a communication delay expected by the terminal device, or moving time of the terminal device. The third device generates a communication coverage request message based on the parameters carried in the communication request message, where the communication coverage request message includes at least one of the following communication parameter information: communication coverage area information and communication service requirement information. The third device sends the communication coverage request message to a second management device.

According to the solution provided in the embodiments, the terminal device reports a moving parameter, and a management device determines, based on the moving parameter, a target access device that needs to provide a communication service for the terminal device, and controls the target access device to enable a communication coverage function. This can avoid a waste of resources.

For example, the terminal device may include an UAV.

Optionally, the second management device may include a NMS device.

Optionally, the third device may include an UCF device or an UAV server.

The UAV server is a device that provides an application service for the terminal in this embodiment. The UAV server may be considered as an application network element in a 5G mobile communication network, or may be located in a data network and communicate with the UAV. The UAV server may be a function module (for example, third-party UAV cloud) in UTM, and supports functions such as registration, flight plan approval, flight operation authorization, flight monitoring, and flight control of the UAV. Alternatively, the UAV server may be an UAV supervision server. The UAV server may alternatively be an UAV application server, and supports control and management of an UAV application service, for example, UAV data collection and video data management.

Optionally, the communication coverage area information may be used to determine an area for which the communication coverage needs to be provided.

Optionally, the communication coverage area information may include information about at least one of the following parameters: a moving range of the terminal device, a destination of the terminal device, a place of departure of the terminal device, a trajectory of the terminal device, a moving speed and direction of the terminal device, or a current position of the terminal device.

Optionally, the communication service requirement information may include, but is not limited to, at least one of the following information: indication information of air communication, indication information of an uplink communication rate, indication information of a downlink communication rate, or indication information of a communication delay.

Optionally, the communication parameter information may further include communication time information.

Optionally, the communication time information may include information about at least one of the following parameters: the moving range of the terminal device, the destination of the terminal device, the place of departure of the terminal device, the trajectory of the terminal device, the moving speed and direction of the terminal device, the current position of the terminal device, or the moving time of the terminal device.

The moving time of the terminal device may include time (or in other words, a time period) at which the terminal device passes by each target network.

According to a fourth aspect, a wireless communication method is provided. The method may include: An access device receives a first configuration message sent by a first management device, where the first configuration message is used to indicate the access device to provide communication coverage.

The access device may provide the communication coverage based on the first configuration message.

According to the solution provided in the embodiments, a terminal device reports a moving parameter, and a management device determines, based on the moving parameter, a target access device that needs to provide a communication service for the terminal device, and controls the target access device to enable a communication coverage function. This can avoid a meaningless waste of resources of an access device (that is, an access device other than the target access device) in a coverage range in which no terminal device arrives.

Optionally, the terminal device may include an UAV.

Optionally, the first management device may include an EMS device.

Optionally, the method may further include: The access device receives a second configuration message sent by the first management device, where the second configuration message is used to indicate a radio parameter corresponding to the communication coverage of the access device; and the access device provides the communication coverage based on the radio parameter.

Optionally, the method may further include: The access device receives a third configuration message sent by the first management device, where the third configuration message is used to indicate communication time corresponding to the communication coverage of the access device; and the access device provides the communication coverage based on the communication time.

According to a fifth aspect, a wireless communication method is provided. The method may include: A first device generates a communication request message, where the communication request message includes at least one of the following parameters: a moving range of a terminal device, a destination of the terminal device, a place of departure of the terminal device, a trajectory of the terminal device, a moving speed and direction of the terminal device or a current position of the terminal device, a communication rate expected by the terminal device, a communication delay expected by the terminal device, or moving time of the terminal device; and the first device sends the communication request message to a third device.

According to the solution provided in the embodiments, the terminal device reports a moving parameter, and a management device determines, based on the moving parameter, a target access device that needs to provide a communication service for the terminal device, and controls the target access device to enable a communication coverage function. This can avoid a meaningless waste of resources of an access device (that is, an access device other than the target access device) in a coverage range in which no terminal device arrives.

Optionally, the first device may include an UAV.

Alternatively, the first device may include a manipulation device (or in other words, a control device) of the UAV.

Optionally, the communication request message may include at least one of the following parameters: the moving range of the terminal device, the destination of the terminal device, the place of departure of the terminal device, the trajectory of the terminal device, the moving speed and direction of the terminal device, or the current position of the terminal device.

Optionally, the communication request message may include at least one of the following parameters: the communication rate expected by the terminal device, the communication delay expected by the terminal device, or the moving time of the terminal device.

Optionally, the communication request message may include a device identifier of the terminal device.

Optionally, a first communication service may include an UAV communication service.

The first communication service may be understood as a service corresponding to communication coverage (for example, a service that needs to be carried by the coverage) provided by a target access network.

In other words, the first communication service may be understood as a service corresponding to communication coverage requested by the communication request message or a communication coverage request message.

Optionally, the third device may include an UCF device or an UAV server.

The UAV server is a device that provides an application service for the terminal in this embodiment. The UAV server may be considered as an application network element in a 5G mobile communication network, or may be located in a data network and communicate with the UAV. The UAV server may be a function module (for example, third-party UAV cloud) in UTM, and supports functions such as registration, flight plan approval, flight operation authorization, flight monitoring, and flight control of the UAV. Alternatively, the UAV server may be an UAV supervision server. The UAV server may alternatively be an UAV application server, and supports control and management of an UAV application service, for example, UAV data collection and video data management.

According to a sixth aspect, a wireless communication apparatus is provided. The apparatus may include: a transceiver unit, configured to receive a communication coverage request message from a second management device, where the communication coverage request message includes at least one of the following communication parameter information: communication coverage area information and communication service requirement information; and a processing unit, configured to determine at least one target access network based on the communication parameter information, where the transceiver unit is further configured to send a first configuration message to the target access network, where the first configuration message is used to indicate the target access network to provide communication coverage.

Optionally, the transceiver unit may be further configured to obtain first network information, where the first network information is used to indicate an access network corresponding to at least one geographical area; and the processing unit is further configured to determine the at least one target access network based on the first network information and the communication parameter information.

Optionally, the processing unit may further configured to determine, based on the communication parameter information, a radio parameter corresponding to the communication coverage of the target access network; and the transceiver unit is further configured to send a second configuration message to the target access network, where the second configuration message is used to indicate the radio parameter.

Optionally, the communication parameter information may further include communication time information, where the processing unit is further configured to determine, based on the communication parameter information, communication time corresponding to the communication coverage of the target access network; and the transceiver unit is further configured to send a third configuration message to the target access network, where the third configuration message is used to indicate the communication time.

Optionally, the communication coverage provided by the target access network is air communication coverage, the first management device includes an EMS device, and the second management device includes a NMS device.

The units in the apparatus are separately configured to perform the steps of the communication method in the first aspect and the implementations of the first aspect.

In a design, the apparatus is a communication chip. The communication chip may include an input circuit or interface configured to send information or data, and an output circuit or interface configured to receive information or data.

In another design, the apparatus is a communication device. The communication device may include a transmitter configured to send information or data, and a receiver configured to receive information or data.

According to a seventh aspect, a wireless communication apparatus is provided. The apparatus may include: a transceiver unit, configured to: receive a communication coverage request message from a third device, where the communication coverage request message includes at least one of the following communication parameter information: communication coverage area information and communication service requirement information; and forward the communication coverage request message to a first management device.

Optionally, the communication parameter information may further include communication time information.

Optionally, communication coverage requested by the communication coverage request message is air communication coverage, the first management device may include an EMS device, a second management device includes a NMS device, and the third device includes an UCF device or an UAV server.

The units in the apparatus are separately configured to perform the steps of the communication method in the second aspect and the implementations of the second aspect.

In a design, the apparatus is a communication chip. The communication chip may include an input circuit or interface configured to send information or data, and an output circuit or interface configured to receive information or data.

In another design, the apparatus is a communication device. The communication device may include a transmitter configured to send information or data, and a receiver configured to receive information or data.

According to an eighth aspect, a wireless communication apparatus is provided. The apparatus may include: a transceiver unit, configured to receive a communication request message, where the communication request message includes at least one of the following parameters: a moving range of a terminal device, a destination of the terminal device, a place of departure of the terminal device, a trajectory of the terminal device, a moving speed and direction of the terminal device or a current position of the terminal device, a communication rate expected by the terminal device, a communication delay expected by the terminal device, or moving time of the terminal device; and a processing unit, configured to generate a communication coverage request message based on the parameters carried in the communication request message, where the communication coverage request message includes at least one of the following communication parameter information: communication coverage area information and communication service requirement information, where the transceiver unit is further used by a third device to send the communication coverage request message to a second management device.

Optionally, the communication parameter information may further include communication time information.

Optionally, communication coverage requested by the communication request message and/or the communication coverage request message may be air communication coverage, the second management device may include a NMS device, and the third device may include an UCF device or an UAV server.

The units in the apparatus are separately configured to perform the steps of the communication method in the third aspect and the implementations of the third aspect.

In a design, the apparatus is a communication chip. The communication chip may include an input circuit or interface configured to send information or data, and an output circuit or interface configured to receive information or data.

In another design, the apparatus is a communication device. The communication device may include a transmitter configured to send information or data, and a receiver configured to receive information or data.

According to a ninth aspect, a wireless communication apparatus is provided. The apparatus includes: a transceiver unit, configured to receive a first configuration message sent by a first management device, where the first configuration message is used to indicate the wireless communication apparatus to provide communication coverage; and a processing unit, configured to provide the communication coverage based on the first configuration message.

Optionally, the first management device may include an EMS device, and the communication coverage indicated by the first configuration message is air communication coverage.

The units in the apparatus are separately configured to perform the steps of the communication method in the fourth aspect and the implementations of the fourth aspect.

In a design, the apparatus is a communication chip. The communication chip may include an input circuit or interface configured to send information or data, and an output circuit or interface configured to receive information or data.

In another design, the apparatus is a communication device. The communication device may include a transmitter configured to send information or data, and a receiver configured to receive information or data.

According to a tenth aspect, a wireless communication apparatus is provided. The apparatus includes: a processing unit, configured to generate a communication request message, where the communication request message includes at least one of the following parameters: a moving range of a terminal device, a destination of the terminal device, a place of departure of the terminal device, a trajectory of the terminal device, a moving speed and direction of the terminal device or a current position of the terminal device, a communication rate expected by the terminal device, a communication delay expected by the terminal device, or moving time of the terminal device; and a communication unit, configured to send the communication request message to a third device.

Optionally, communication coverage requested by the communication request message may be air communication coverage, the wireless communication apparatus may include an UAV, an UAV control device, or an UAV server, and the third device includes an UCF device or an UAV server.

The units in the apparatus are separately configured to perform the steps of the communication method in the fifth aspect and the implementations of the fifth aspect.

In a design, the apparatus is a communication chip. The communication chip may include an input circuit or interface configured to send information or data, and an output circuit or interface configured to receive information or data.

In another design, the apparatus is a communication device. The communication device may include a transmitter configured to send information or data, and a receiver configured to receive information or data.

According to an eleventh aspect, a communication device is provided. The communication device includes a processor and a memory. The memory is configured to store a computer program, and the processor is configured to invoke the computer program from the memory and run the computer program, to enable the communication device to perform the communication method in any one of the first aspect to the fifth aspect and the possible implementations thereof.

Optionally, there may be one or more processors, and there may be one or more memories.

Optionally, the memory may be integrated with the processor, or the memory and the processor may be separately disposed.

Optionally, the communication device may further include a transmitter and a receiver.

According to a twelfth aspect, a communication system is provided. The communication system includes the communication device provided in the eleventh aspect.

In other words, the communication system includes a communication device configured to perform the first aspect and the possible implementations thereof;
the communication system includes a communication device of a communication system configured to perform the second aspect and the possible implementations thereof;
the communication system includes a communication device of a communication system configured to perform the third aspect and the possible implementations thereof;
the communication system includes a communication device of a communication system configured to perform the fourth aspect and the possible implementations thereof; or
the communication system includes a communication device of a communication system configured to perform the fifth aspect and the possible implementations thereof.

In a possible design, the communication system may further include another device interacting with the communication device in the solutions provided in the embodiments.

According to a thirteenth aspect, a computer program product is provided. The computer program product includes a computer program (which may also be referred to as code or instructions). When the computer program is run, a computer is enabled to perform the method in any one of the possible implementations of the first aspect to the fifth aspect.

According to a fourteenth aspect, a computer-readable medium is provided. The computer-readable medium stores a computer program (which may also be referred to as code or instructions). When the computer program is run on a computer, the computer is enabled to perform the method in any one of the possible implementations of the first aspect to the fifth aspect.

According to a fifteenth aspect, a chip system is provided. The chip system includes a memory and a processor. The memory is configured to store a computer program, and the processor is configured to invoke the computer program from the memory and run the computer program, to enable a communication device on which the chip system is installed to perform the method in any one of the possible implementations of the first aspect to the fifth aspect.

The chip system may include an input circuit or interface configured to send information or data, and an output circuit or interface configured to receive information or data.

According to the solution provided in the embodiments, a terminal device reports a moving parameter, and a management device determines, based on the moving parameter, a target access device that needs to provide a communication service for the terminal device, and controls the target access device to enable a communication coverage function. This can avoid a meaningless waste of resources of an access device (that is, an access device other than the target access device) in a coverage range in which no terminal device arrives.

BRIEF DESCRIPTION OF DRAWINGS

FIG. 5 is a schematic diagram of an example of a frame structure of communication request information according to an embodiment;

FIG. 6 is a schematic structural diagram of an example of a wireless communication apparatus according to an embodiment;

FIG. 7 is a schematic structural diagram of another example of a wireless communication apparatus according to an embodiment;

DETAILED DESCRIPTION OF THE EMBODIMENTS

Terminologies such as "component", "module", and "system" are used to indicate computer-related entities, hardware, firmware, a combination of hardware and software, software, or software being executed. For example, a component may be, but is not limited to, a process that is run on a processor, a processor, an object, an executable file, a thread of execution, a program, and/or a computer. As shown in figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. The components may communicate, by using a local and/or remote process and based on, for example, a signal having one or more data packets (for example, data from two components interacting with another component in a local system, in a distributed system, and/or across a network such as the Internet interacting with another system by using the signal).

The solutions in the embodiments may be applied to various communication systems, for example, a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a future $5^{th}$ generation (5G) system, or a new radio system.

Usually, a conventional communication system supports a limited quantity of connections and is easy to implement. However, with development of communications technologies, a mobile communication system not only supports conventional communication, but also supports, for example, device to device (D2D) communication, machine to machine (M2M) communication, machine type communication (MTC), and vehicle to everything (V2X) communication, for example, vehicle to vehicle (V2V) communication, vehicle to infrastructure (V2I) communication, vehicle to pedestrian (V2P) communication, and vehicle to network (V2N) communication.

Figure 1:
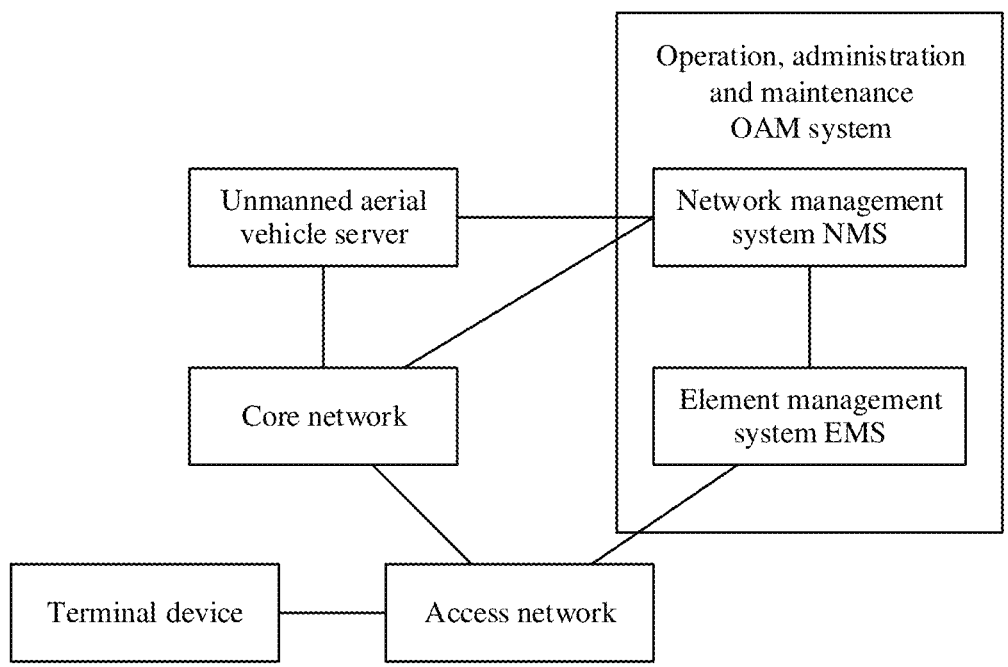
FIG. 1 is a schematic structural diagram of a communication system according to an embodiment.

FIG. 1 shows a network architecture used in an embodiment. Network elements that may be used in the network architecture are separately described.

1. Terminal device: The terminal device may include various communication devices that have a wireless communication function. The terminal device may be user equipment, an access terminal, a subscriber unit, a subscriber station, a mobile station, a remote station, a remote terminal, a mobile device, a user terminal, a terminal, a wireless communication device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, a terminal device in a future evolved public land mobile network (PLMN), or the like. This is not limited in the embodiments.

For example, in the embodiments, the terminal device may include an UAV.

The UAV, has developed from "for military use" to "for increasingly wide civil use" such as UAV plant protection, UAV aerial photography, and UAV forest fire alarm monitoring. The civil use is also a future development trend of the UAV.

Figure 2:
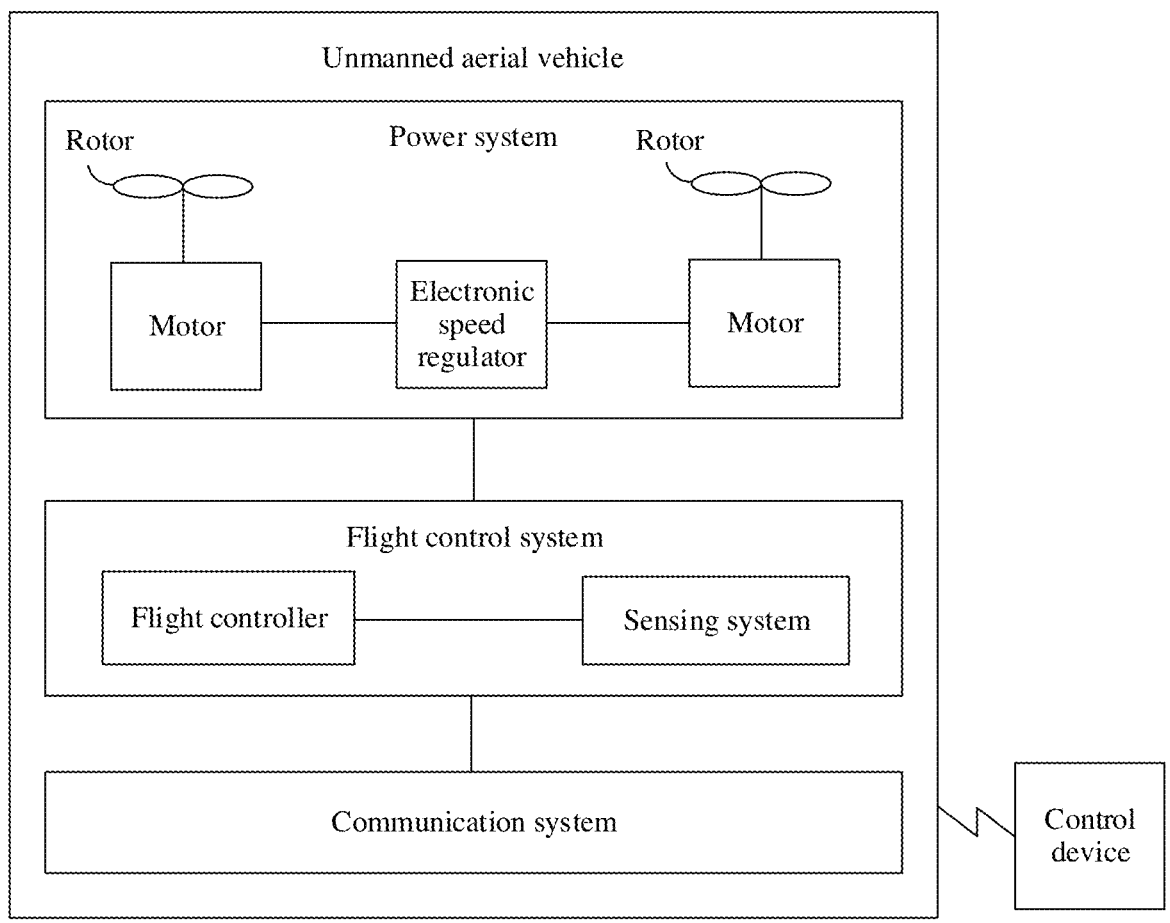
FIG. 2 is a schematic structural diagram of an UAV according to an embodiment.

FIG. 2 is a schematic architectural diagram of an UAV according to an embodiment. In this embodiment, a rotorcraft is used as an example for description.

As shown in FIG. 2, a UAV may include a power system, a flight control system, and a communication system.

The communication system may implement wireless communication between the UAV and a control device. The wireless communication may be implemented based on a mobile network. That is, the UAV can access the mobile network by using the communication system, and then transmit data over the mobile network.

For example, the communication system of the UAV may include one or more antennas. In addition, the communication system of the UAV may include a transmitter chain and a receiver chain. A person of ordinary skill in the art may understand that both the transmitter chain and the receiver chain may include a plurality of components (for example, a processor, a modulator, a multiplexer, a demodulator, a demultiplexer, or an antenna) related to signal sending and receiving.

At a given time, the UAV may be a sending apparatus for wireless communication and/or a receiving apparatus for wireless communication. When sending data, the communication system of the UAV may encode the data for transmission. The communication system of the UAV may obtain (for example, generate, receive from another communication apparatus, or store in a memory) a specific quantity of data bits that need to be sent, through a channel, to the receiving apparatus for wireless communication. The data bits may be included in a transport block (or a plurality of transport blocks) of the data, and the transport block may be segmented to generate a plurality of code blocks.

The power system may include electronic speed regulators (ESR), one or more rotors (for example, propellers), and motors that provide power for the propellers. The motors are connected between ESR and the propellers, and the motors and the propellers are disposed on corresponding arms. The flight control system may include a flight controller and a sensing system. The flight controller is configured to control flight of the UAV. For example, the flight controller may control the flight of the UAV based on posture information measured by the sensing system. It may be understood that the flight controller may control the UAV according to program instructions compiled in advance, or may control the UAV in response to one or more control instructions from the control device.

The control device may be located on a ground side, may communicate with the UAV in a wireless manner (for example, over the mobile network), and is configured to remotely manipulate the UAV. A manipulation device may be, for example, a remote controller or a terminal device on which an application for controlling a UAV is installed, for example, a smartphone or a tablet computer. In this embodiment, receiving a user input by using the manipulation device may mean manipulating the UAV by using an input apparatus such as a pulling wheel, a button, a key, or a joystick on the remote controller or a user interface (UI) on the terminal device.

It may be understood that the foregoing naming of the components of the unmanned aerial system is merely for the purpose of identification, and shall not be construed as a limitation on the embodiments.

In addition, the foregoing listed UAV is merely an example of the terminal device in the embodiments, and the embodiments are not limited thereto. For example, in the embodiments, the terminal device may alternatively be an autonomous vehicle. The autonomous vehicle may also be referred to as a driverless car, a computer-driven vehicle, or a wheeled mobile robot, and is an intelligent vehicle that implements unmanned driving by using a computer system. The autonomous vehicle relies on artificial intelligence, visual computing, radar, and collaboration of a surveillance apparatus and a global positioning system, so that a computer can operate motor vehicles autonomously and safely without any human intervention.

Alternatively, the terminal device may be a wearable device. The wearable device may also be referred to as a wearable intelligent device, and is a general term for wearable device such as glasses, gloves, watches, clothes, and shoes that are developed by applying wearable technologies to intelligent designs of daily wear. The wearable device is a portable device that can be directly worn by a user or integrated into clothes or an accessory of a user. The wearable device is not only a hardware device, but is used to implement powerful functions through software support, data exchange, and cloud interaction. Generalized wearable intelligent devices include full-featured and large-size devices that can implement complete or partial functions without depending on smartphones, for example, smart watches or smart glasses, and devices that focus on only one type of application function and need to work with another device such as a smartphone, for example, various smart bands or smart accessories for monitoring physical signs.

In addition, the terminal device in the embodiments may alternatively be a terminal device in an internet of things (IoT) system. The IoT is an important part of future development of information technologies. A main feature of the IoT is to connect a thing to a network by using a communication technology, to implement an intelligent network for interconnection between a person and a machine or between one thing and another.

For ease of understanding and description, the following describes in detail the solutions provided in the embodiments by using an example in which the UAV is the terminal device.

2. (Radio) access network ((R)AN) network element: The (R)AN network element is configured to provide a network access function for authorized terminal devices in a specific area, and can use transmission tunnels with different quality based on levels of the terminal devices, requirements of services, and the like.

The (R)AN network element can manage radio resources and provide an access service for a terminal device, to forward a control signal and terminal device data between the terminal device and a core network. The (R)AN network element may also be understood as a base station in a conventional network.

It may be understood that the "network element" may also be referred to as an entity, a device, an apparatus, a module, or the like. This is not limited in the embodiments. In addition, in the embodiments, for ease of understanding and description, the description of the "network element" is omitted in some descriptions. For example, a (R)AN network element is briefly referred to as a (R)AN. In this case, the "(R)AN network element" should be understood as a (R)AN network element or a (R)AN entity. Same or similar cases are not described below.

The (R)AN network element may include an access device. The access device may serve a cell. The terminal device communicates with the access device on a transmission resource (for example, a frequency domain resource, or in other words, a frequency spectrum resource) used for the cell. The cell may be a cell corresponding to the access device (for example, a base station). The cell may belong to a macro base station, or a base station corresponding to a small cell. The small cell herein may include a metro cell, a micro cell, a pico cell, a femto cell, or the like. These small cells have features of a small coverage range and low transmit power, and are suitable for providing a high-rate data transmission service.

In addition, a plurality of cells may simultaneously work in a same frequency band on a carrier in the LTE system or the 5G system. In some special scenarios, the concept of the carrier is considered equivalent to that of the cell. For example, in a carrier aggregation (CA) scenario, both a carrier index of a secondary component carrier and a Cell ID of a secondary cell that works on the secondary component carrier are carried when the secondary component carrier is configured for UE. In this case, the concept of the carrier may be considered equivalent to that of the cell. For example, that the UE accesses a carrier is equivalent to a description that the UE accesses a cell.

The access device may include one or more antennas. In addition, the access device may additionally include a transmitter chain and a receiver chain. A person of ordinary skill in the art may understand that both the transmitter chain and the receiver chain may include a plurality of components (for example, a processor, a modulator, a multiplexer, a demodulator, a demultiplexer, or an antenna) related to signal sending and receiving.

Each access device may communicate with a plurality of terminal devices.

The access device may send data or information to the terminal device over a forward link (also referred to as a downlink), and receive data or information from the terminal device over a reverse link (also referred to as an uplink).

In the FDD system, for example, the forward link and the reverse link may have different frequency bands.

In the TDD system and a full duplex system, the forward link and the reverse link may have a same frequency band.

Each antenna (or antenna group including a plurality of antennas) and/or area designed for communication are/is referred to as a sector of the access device.

For example, the antenna group may be designed to communicate with a terminal device in a sector within a coverage area of the access device. The access device may send, through a single antenna or a multi-antenna transmit diversity, signals to all terminal devices in a corresponding sector.

In a process in which the access device communicates with the terminal device over the forward link, a transmit antenna of the access device may improve a signal-to-noise ratio of the forward link through beamforming.

In addition, interference to a mobile device in an adjacent cell when the access device sends signals through beamforming to the terminal devices that are randomly scattered in a related coverage area is less than that caused in a manner in which the access device sends, through a single antenna or a multi-antenna transmit diversity, signals to all terminal devices served by the access device.

At given time, the access device may be a sending apparatus for wireless communication and/or a receiving apparatus for wireless communication. When sending data, the sending apparatus for wireless communication may encode data for transmission. The sending apparatus for wireless communication may obtain (for example, generate, receive from another communication apparatus, or store in a memory) a specific quantity of data bits to be sent, through a channel, to the receiving apparatus for wireless communication. The data bits may be included in a transport block (or a plurality of transport blocks) of the data, and the transport block may be segmented to generate a plurality of code blocks.

In the embodiments, the communication system may include a core network.

By way of example, and not limitation, the core network may include at least one network element described in the following 3 to 13.

3. User plane network element: The user plane network element is configured to perform packet routing and forwarding, quality of service (QoS) processing of user plane data, and the like.

In the 5G communication system, the user plane network element may be a user plane function (UPF) network element. In a future communication system, the user plane network element may still be the UPF network element, or may have another name. This is not limited in the embodiments.

4. Data network element: The data network element is configured to provide a network for data transmission.

In the 5G communication system, the data network element may be a data network (DN) element. In the future communication system, the DN element may still be the DN network element, or may have another name. This is not limited in the embodiments.

5. Access management network element: The access management network element is mainly used for mobility management, access management, and the like, and may be configured to implement functions, for example, lawful interception and access authorization/authentication, other than session management in functions of a mobility management entity (MME).

In the 5G communication system, the access management network element may be an access and mobility management function (AMF) network element. In the future communication system, the access management network element may still be the AMF network element, or may have another name. This is not limited in the embodiments.

6. Session management network element: The session management network element is mainly configured to: manage a session, assign and manage an internet protocol (IP) address of a terminal device, select an endpoint that can manage a user plane function interface and a policy control and charging function interface, notify downlink data, and so on.

In the 5G communication system, the session management network element may be a session management function (SMF) network element. In the future communication system, the session management network element may still be the SMF network element, or may have another name. This is not limited in this application.

7. Policy control network element: The policy control network element is configured to: provide guidance on a unified policy framework for network behavior, provide policy rule information for a control plane function network element (such as the AMF or the SMF network element), and so on.

In the 4G communication system, the policy control network element may be a policy and charging rules function (PCRF) network element. In the 5G communication system, the policy control network element may be a policy control function (PCF) network element. In the future communication system, the policy control network element may still be the PCF network element, or may have another name. This is not limited in the embodiments.

8. Binding support network element: The binding support network element is configured to search for a PCF associated with a session.

In the 5G communication system, the binding support network element may be a binding support function (BSF) network element. In the future communication system, the binding support network element may still be the BSF network element, or may have another name. This is not limited in the embodiments.

9. Authentication server: The authentication server is configured to: authenticate a service, generate a key to implement bidirectional authentication for a terminal device, and support a unified authentication framework.

In the 5G communication system, the authentication server may be an authentication server function (AUSF) network element. In the future communication system, the authentication server function network element may still be the AUSF network element, or may have another name. This is not limited in the embodiments.

10. Data management network element: The data management network element is configured to: process a terminal device identifier, and perform access authentication, registration, mobility management, and the like.

In the 5G communication system, the data management network element may be a unified data management (UDM) network element. In the future communication system, the unified data management may still be the UDM network element, or may have another name. This is not limited in the embodiments.

11. Application network element: The application network element is configured to: perform application-affected data routing, access a network exposure function network element, interact with a policy framework to perform policy control, and so on.

In the 5G communication system, the application network element may be an application function (AF) network element. In the future communication system, the application network element may still be the AF network element, or may have another name. This is not limited in the embodiments.

12. Network repository network element: The network repository network is configured to maintain real-time information of all network function services in a network.

In the 5G communication system, the network repository network element may be a network repository function (NRF) network element. In the future communication system, the network repository network element may still be the NRF network element, or may have another name. This is not limited in the embodiments.

13. UCF: The UCF is configured to support communication and supervision of UAV in a mobile communication network. For example, the UCF may receive an air communication request of the UAV and perform air coverage enhancement optimization. For another example, the UCF may obtain an air coverage capability of a cellular network and cell load information from an OAM. For another example, the UCF may interact with another core network element (such as the AMF, an NEF, or the AF).

14. Network management system: The network management system may also be referred to as an operation, administration and maintenance (OAM) network element, and is configured to implement a network management function. For example, the network management system may obtain a network running status, analyze the network running status, and control the network. The network management system may analyze reference signal received power (RSRP), a channel quality indicator (CQI), a weak coverage ratio indicator, a cell boundary, weak coverage area convergence, and the like of an area based on information about a reported measurement report on a live network.

For example, the OAM may include the following devices:

14-1. NMS device: The NMS device is a NMS in a mobile communication network. The NMS device may manage all entities in the network, such as a network device, an application program, a server system, a router, a switch, a multi-port forwarder (HUB), and an auxiliary device (such as a UPS power supply), and provide a network view of the entire system for a network system administrator. The NMS may provide configuration, accounting, performance, and security functions. In addition, the NMS may display a network topology. That is, the NMS may have a function of automatically discovering networked devices, and may establish a layout mapping diagram of a network by using a hierarchical view. In addition, the NMS may have a port status monitoring and analyzing function. That is, the NMS may monitor and analyze a port status of a network device, so that a network administrator can conveniently obtain extended data of the port status, a bandwidth utilization table, a traffic statistics table, protocol information, and another network efficiency statistics table by using the NMS. In addition, the NMS can analyze the network performance and status in charts. That is, the NMS can flexibly analyze curves and charts, so that the network administrator can quickly learn of a network running status and record related data, and export analysis results as files or use the analysis results in other data analysis tools such as electronic forms.

14-2. EMS device: The EMS device is a system that manages one or more network elements (NE) of a specific type. To support communication between NEs, the EMS may communicate with the foregoing NMS. The EMS is a basis of an operations support system (OSS) architecture that complies with a TMN hierarchical model. This architecture allows service providers (SP) to meet requirements of customers on services developing at a high speed and also meet requirements for strict quality of service (QoS). The EMS provides a unified operation and maintenance (O&M) function for professional networks, focuses on management of network elements in regions, networks, and subnets, and can manage and maintain devices and networks in an end-to-end manner. For example, one EMS may be used to centrally manage an IP multimedia subsystem (IMS) network and device of one operator. The device includes: a core network device, a data communication device, a next generation network (NGN) device, a service device, and a third-party information technology (IT) device. The EMS may provide functions such as network management error, configuration, accounting, performance, and security. In addition, the EMS can perform topology management. That is, the EMS can view, edit, and operate distribution places, network structures, link connection, and service distribution of network resources of each service system through the topology management function. The EMS further supports display of a topological relationship between service subnets, and access and management of network elements. In addition, the EMS can back up and restore a system. That is, the EMS can periodically back up and clear data such as alarms, logs, and performance that are stored in a database, and network management versions. This prevents accidental loss of the system data and ensures high availability of the data. In addition, the EMS can further perform system monitoring. For example, the EMS monitors and views performance of an application server and a database server. In addition, the EMS can further manage logs. That is, the EMS provides functions of querying logs and viewing detailed log information. The log may include but is not limited to an operation log (which records operation information of a user), a security log (which records log information of user login and logout), and a system log (which records a completion status of a scheduled task). In addition, the EMS may further provide a northbound interface. That is, the EMS may provide a plurality of northbound interfaces, for example, a common object request broker architecture (CORBA) interface, a man-machine language (MML) interface, a file transfer protocol (FTP) interface, a secure file transfer protocol (SFTP) interface, and a simple network management protocol (SNMP) interface, to implement interconnection between the EMS and the NMS. In addition, the EMS can be further used as a command terminal. The command terminal is a command line tool provided by the network management system. An administrator enters a single command or batch processing commands in this tool to manage the network management objects.

15. UAV server (UVS): The UVS is configured to provide an application service for a terminal.

The UVS may be used as an application network element in a mobile communication network (for example, the 5G network).

Alternatively, the UVS may be configured in a data network to communicate with the UAV.

The UVS may be a function module (for example, third-party UAV cloud) in UTM, and supports functions such as registration, flight plan approval, flight operation authorization, flight monitoring, and flight control of the UAV. Alternatively, the UVS may be an UAV supervision server. The UVS may alternatively be an UAV application server, and supports control and management of an UAV application service, for example, UAV data collection and video data management.

In addition, the UVS may be a server of the terminal device or a server of the UAV. This is not particularly limited in the embodiments.

It may be understood that the "network element" may also be referred to as an entity, a device, an apparatus, a module, or the like. This is not limited in the embodiments. In addition, in the embodiments, for ease of understanding and description, the description of the "network element" is omitted in some descriptions. For example, an AMF network element is briefly referred to as an AMF. In this case, the "AMF" should be understood as an AMF network element or an AMF entity. Same or similar cases are not described below.

It may be understood that the foregoing network element or function may be a network element in a hardware device, a software function running on dedicated hardware, or a virtualization function instantiated on a platform (for example, a cloud platform).

It may be understood that the network elements included in the communication systems listed above are merely examples for description, and the embodiments are not limited thereto. For example, the network elements may further include but are not limited to:

a network exposure function (NEF) network element, configured to securely expose, to outside, a service, a capability, and the like that are provided by a 3GPP network function;

a UDM network element, configured to perform user identifier processing, access authentication, registration, mobility management, and the like; and a network data analytics function (NWDAF) network element, configured to: collect and store information from a terminal device, a RAN network element, and another network entity (for example, the AMF network element), analyze the information, generate user-related context information (which may be considered as application layer information), and distribute the application layer information.

In this network architecture, an N2 interface is a reference point between the RAN network element and the AMF network element, and is configured to send a non-access stratum (NAS) message, and the like. An N3 interface is a reference point between the RAN network element and the UPF network element, and is configured to transmit user plane data, and the like. An N4 interface is a reference point between the SMF network element and the UPF network element, and is configured to transmit information such as tunnel identifier information of an N3 connection, data buffer indication information, and a downlink data notification message. An N6 interface is a reference point between the UPF network element and the DN network element, and is configured to transmit user plane data, and the like. An N23 interface is a reference point between the NWDAF network element and the PCF network element. If the AF network element is an AF network element in a network, the AF network element interacts with another network element by using the PCF network element or the NEF network element.

It may be understood that the foregoing network architecture applied to this embodiment is merely an example of a network architecture described from a perspective of a service architecture, and a network architecture applicable to this embodiment is not limited thereto. Any network architecture that can implement functions of the foregoing network elements is applicable to this embodiment.

For example, in some network architectures, network function entities such as the AMF, the SMF, the PCF, and the UDM are all referred to as NF network elements. Alternatively, in some other network architectures, a set of network elements such as the AMF, the SMF, the PCF, and the UDM may be referred to as a control plane function (CPF) network element.

Figure 3:
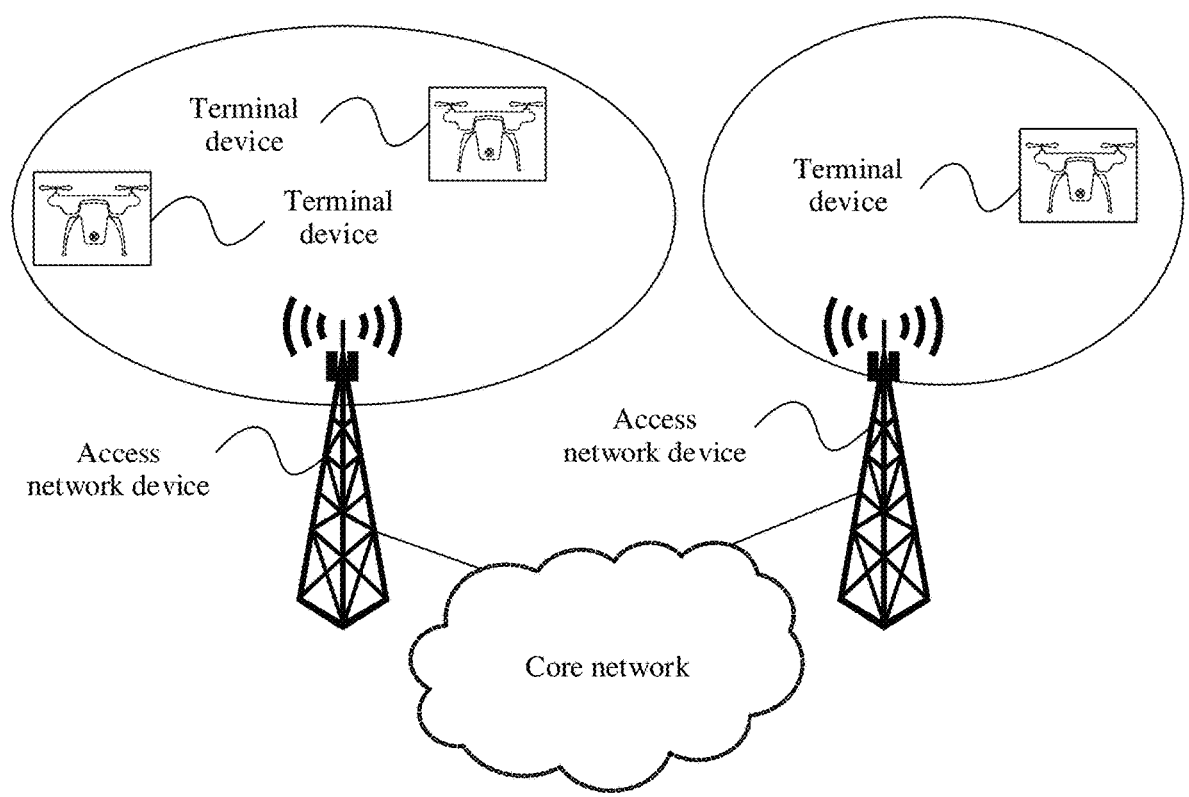
FIG. 3 is a schematic structural diagram of a communication system according to an embodiment.

FIG. 3 is a schematic architectural diagram of a mobile communication system to which an embodiment is applicable. As shown in FIG. 3, the mobile communication system includes at least one core network device, at least one access device, and at least one terminal device.

In the embodiments, the access devices may be connected in a wireless or wired manner. When the access devices are connected in a wireless manner, wireless communication may be performed through, for example, an X2 interface.

In addition, the access device may be connected to the core network device in the wireless or wired manner.

In the mobile communication system, the terminal device may be an UAV flying at a low altitude, and the access device may wirelessly communicate with the terminal device.

In addition, the core network device and the access device that communicates with the core network device may be different independent physical devices, a function of the core network device and a logical function of the access device may be integrated into a same physical device, or some functions of the core network device and some functions of the access device may be integrated into one physical device.

It may be understood that, FIG. 3 is only a schematic diagram. The mobile communication system may further include another network device, for example, may further include a wireless relay device and a wireless backhaul device which are not shown in FIG. 3. In addition, quantities of core network devices, radio access devices, and terminal devices included in the mobile communication system are not limited in the embodiments.

In the embodiments, the terminal device or the network device may include a hardware layer, an operating system layer running above the hardware layer, and an application layer running above the operating system layer. The hardware layer includes hardware such as a central processing unit (CPU), a memory management unit (MMU), and a memory (which is also referred to as a main memory). The operating system may be any one or more computer operating systems that implement service processing by using a process, for example, a Linux operating system, a Unix operating system, an Android operating system, an iOS operating system, or a Windows operating system. The application layer may include applications such as a browser, an address book, word processing software, and instant communication software. In addition, a specific structure of an execution body of a method provided in the embodiments is not limited in the embodiments, provided that a program that records code for the method provided in the embodiments can be run to perform communication according to the method provided in the embodiments. The method provided in the embodiments may be performed by a terminal device, a network device, or a functional module that is in a terminal device or a network device and that can invoke and execute the program.

In addition, aspects or features of the embodiments may be implemented as a method, an apparatus, or a product that uses standard programming and/or engineering technologies. The term "product" covers a computer program that can be accessed from any computer-readable component, carrier, or medium. For example, the computer-readable medium may include, but is not limited to, a magnetic storage component (for example, a hard disk, a floppy disk, or a magnetic tape), an optical disc (for example, a compact disc (CD), or a digital versatile disc (DVD)), a smart card, and a flash memory component (for example, an erasable programmable read-only memory (EPROM), a card, a stick, or a key drive). In addition, various storage media described in may indicate one or more devices and/or other machine-readable media that are configured to store information. The term "machine-readable media" may include, but is not limited to, a radio channel, and various other media that can store, contain, and/or carry instructions and/or data.

Figure 4:
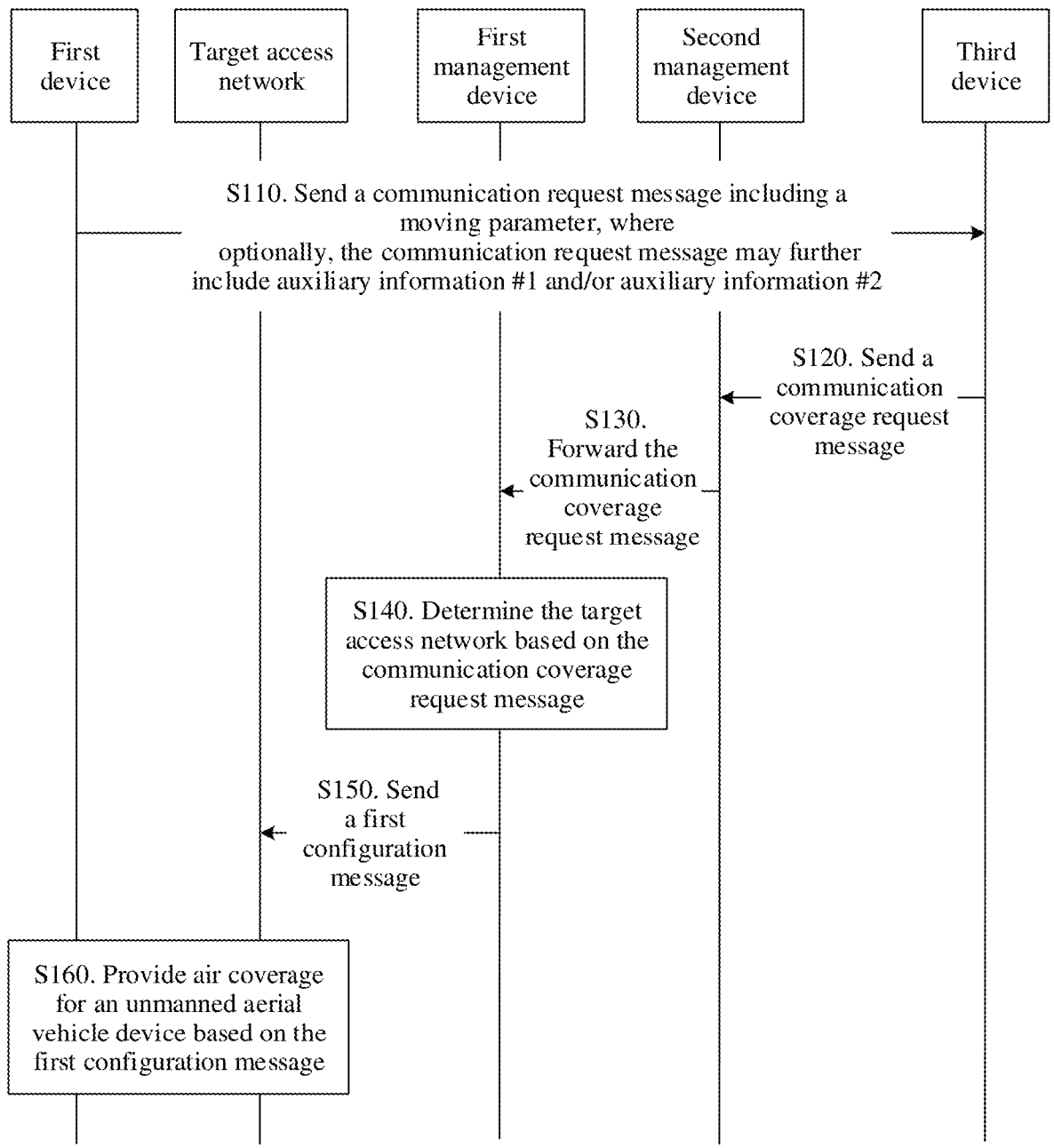
FIG. 4 is a schematic flowchart of a wireless communication method according to an embodiment.

FIG. 4 is a schematic flowchart of an example of a wireless communication process according to the embodiments.

When an UAV needs to request a mobile network to provide air coverage, or in other words, when the UAV requests to access an air communication service (that is, an example of a first communication service), as shown in FIG. 4, in S110, a first device (for example, the UAV or a server of the UAV) may determine a moving parameter.

The moving parameter may be used to determine an area or a range for which air coverage needs to be provided.

In the embodiments, the moving parameter may include, but is not limited to, one or more of the following parameters.

Parameter A: Moving Range

For example, the moving range may include a moving range of the UAV in a horizontal direction. That is, the UAV moves within the moving range in the horizontal direction, or in other words, the UAV does not move out of the moving range in the horizontal direction.

For example, the moving range (a boundary of the moving range) may be a circle. In this case, the parameter A may include coordinates of a center of the moving range and a radius of the moving range.

For another example, the moving range (a boundary of the moving range) may be a shape enclosed by a plurality of boundary points that are sequentially connected. In this case, the parameter A may include coordinates of the plurality of boundary points.

It may be understood that the foregoing enumerated shapes of the moving range and representation forms of the parameter A are merely examples for description and are not particularly limited in the embodiments, provided that moving ranges determined by both communication parties (namely, the UAV and a core network device) based on the parameter A are consistent.

For example, the moving range may include a moving range of the UAV in a vertical direction, or in other words, a flight height range of the UAV. For example, the moving range in the vertical direction may be limited by using a minimum flight height and a maximum flight height.

Parameter B: Destination of a Movement

The destination is an end position, or in other words, an end point of the movement of the UAV.

For example, the parameter B may include coordinates of the destination.

Parameter C: Place of Departure of the Movement

The place of departure is a start position, or in other words, a start point of the movement of the UAV.

For example, the parameter C may include coordinates of the place of departure.

Parameter D: Trajectory

The trajectory is a route along which the UAV moves. That is, the UAV moves along the trajectory.

For example, the trajectory may be a curve formed by sequentially connecting a plurality of passing points. In this case, the parameter D may include coordinates of the plurality of passing points.

Parameter E: Moving Direction

The moving direction is a direction towards which the UAV moves.

The parameter D may include coordinates of at least two passing points (for example, a start point and an end point) that the UAV passes by in a moving process, and a sequence in which the UAV passes by the at least two passing points.

For another example, the parameter D may include a vector of the moving direction.

Parameter F: Moving Speed

The moving speed is a speed at which the UAV moves.

For example, the parameter F may include a vector of the moving speed.

Parameter G: Current Position of the UAV

By way of example, and not limitation, the current position of the UAV may be understood as a position of the UAV when the UAV performs S110.

For another example, the current position of the UAV may be understood as a position of the UAV when the mobile network needs to provide an air coverage service.

It may be understood that the moving parameter listed above are merely examples for description, and other parameters that can be used to determine at least one area or position that the UAV passes by in a moving process fall within the protection scope of the embodiments.

By way of example, and not limitation, the moving parameter may be input by a user of the UAV to the UAV.

Alternatively, the moving parameter may be obtained after the UAV analyzes a flight route.

Alternatively, the moving parameter may be obtained after the UAV analyzes instructions input by a controller (or in other words, a remote controller or a manipulator).

It may be understood that the foregoing listed method and process for determining the moving parameter by the UAV are merely examples for description. the embodiments are not limited thereto. Other solutions by using which the UAV can determine the moving parameter fall within the protection scope of the embodiments.

The UAV may further determine auxiliary information #1 (or in other words, a communication parameter).

The auxiliary information #1 may be used (by an access device or the core network device) to determine a communication parameter (or in other words, an air interface configuration parameter) of the air communication service.

In the embodiments, the air interface configuration parameter may include, but is not limited to, one or more of the following parameters:

Bandwidth Configuration

In this embodiment, the bandwidth configuration may indicate a width, used on a frequency domain resource, required by an air interface. By way of example, and not limitation, a bandwidth configuration corresponding to a broadband transmission service may indicate a minimum frequency domain resource width required by the air interface, or in other words, a quantity of subcarriers; a bandwidth configuration corresponding to a narrowband transmission service may indicate a maximum frequency domain resource width required by the air interface, or in other words, a quantity of subcarriers.

Transmit Power

The transmit power is a transmit signal strength of the access device or the UAV.

For example, a measurement unit of the transmit power may include, but is not limited to, any one of the following units:

Power (W): Linear level with respect to 1 watt

Gain (dBm): Proportional level with respect to 1 milliwatt

It may be understood that content included in an air interface configuration listed above is merely an example for description, and is the embodiments are not limited thereto. All other objects of the air interface configuration applicable to wireless communication fall within the protection scope of configuration information in the embodiments.

By way of example, and not limitation, in the embodiments, the auxiliary information #1 may include, but is not limited to, the following parameters:

Parameter H: Communication Rate Expected by the UAV

That is, the access device and the core network device can adjust or select the air interface configuration parameter based on the parameter H, so that a communication rate between the access device and the UAV meets (for example, is greater than or equal to) the communication rate expected by the UAV.

Parameter I: Communication Delay Expected by the UAV

That is, the access device and the core network device can adjust or select the air interface configuration parameter based on the parameter I, so that a communication delay between the access device and the UAV meets (for example, is less than or equal to) the communication delay expected by the UAV.

The auxiliary information #1 may further include some or all of the foregoing moving parameters.

In other words, the access device and the core network device may calculate a distance between the access device and the UAV based on the moving parameter, and then adjust or select the air interface configuration parameter based on the distance, so that the communication rate between the access device and the UAV meets the communication rate expected by the UAV, or the communication delay between the access device and the UAV meets the communication delay expected by the UAV.

Optionally, the UAV may further determine auxiliary information #2 (or in other words, a time parameter).

The auxiliary information #2 may be used (by the access device or the core network device) to determine a parameter of communication time (or in other words, a communication time period, a communication start moment, or a communication end moment) of the air communication service.

By way of example, and not limitation, in the embodiments, the auxiliary information #2 may include, but is not limited to, the following parameters:

Parameter J: Moving Time of the UAV

The moving time of the UAV may include a moving start moment of the UAV and a moving end moment of the UAV.

Alternatively, the moving time of the UAV may include a moving start moment of the UAV and moving duration of the UAV.

In this case, the access device and the core network device may determine, based on the parameter J, a time period in which the UAV is located in a coverage range of the access device or a coverage range of a cell provided by the access device, so as to provide an air coverage service in the time period.

Optionally, the auxiliary information #2 may further include some or all of the foregoing moving parameters.

The access device and the core network device may calculate, based on the moving parameter, a time period in which the UAV is located in a coverage range of the access device or a coverage range of a cell provided by the access device, so as to provide an air coverage service in the time period.

The first device may send a communication request message to a third device (for example, a UCF) (by using, for example, the access device or the core network device such as an AMF). The communication request message may be used to indicate the UAV to request the mobile network to provide air coverage. In other words, the request information may be used to indicate the UAV to request to access the air communication service (that is, the example of the first communication service).

In addition, the communication request message may include the moving parameter.

In other words, the communication request message and the moving parameter may be carried in a same message or a same piece of signaling.

The communication request message may further carry the auxiliary information #1 or the auxiliary information #2.

It may be understood that the moving parameter and the communication request message may alternatively be carried in different signaling. In other words, the moving parameter and the communication request message may alternatively be asynchronously transmitted. This is not limited in the embodiments.

In addition, the moving parameter and the auxiliary information #1 or the auxiliary information #2 may alternatively be carried in different signaling. In other words, the moving parameter and the auxiliary information #1 or the auxiliary information #2 may alternatively be asynchronously transmitted. This is not limited in the embodiments.

In addition, the communication request message and the auxiliary information #1 or the auxiliary information #2 may alternatively be carried in different signaling. In other words, the communication request message and the auxiliary information #1 or the auxiliary information #2 may alternatively be asynchronously transmitted. This is not limited in the embodiments.

In the embodiments, the communication request message may be carried in a preset message or preset signaling.

FIG. 5 shows an example of the communication request message according to the embodiments. As shown in FIG. 5, the message may include, but is not limited to, the following fields:

Message type field: For example, information carried in the message type field may indicate that a type of the message is an N1 message type.

Message purpose field: For example, information carried in the message purpose field may be used to indicate that a purpose of the message is a communication request. The information carried in the message purpose field may be used to indicate that the purpose of the message is an air communication request.

Terminal type field: For example, information carried in the terminal type field may be used to indicate that a terminal requesting communication is the UAV.

Terminal identifier field: The terminal identifier field may be used to carry a device identifier of a terminal device (for example, the UAV). By way of example, and not limitation, in the embodiments, the device identifier may include, but is not limited to, an IP address, an IP port, a media access control (MAC) address, a mobile phone number, an international mobile subscriber identity (IMSI), an international mobile equipment identity (IMEI), a radio network temporary identifier (RNTI), and the like.

Moving area field: For example, information carried in the moving area field may indicate longitude, latitude, and height limits of a movement.

Trajectory field: For example, information carried in the trajectory field may indicate point track coordinate information of the trajectory.

Moving time period field: For example, information carried in the moving time period field may indicate start time and end time of a movement.

Communication requirement field: For example, information carried in the communication requirement field may be used to indicate an uplink/downlink rate and a delay requirement of a terminal requesting communication.

By way of example, and not limitation, the preset message or preset signaling may include, but is not limited to, a NAS message.

In S120, the third device may generate a communication coverage request message based on the communication request message.

It may be understood that if the third device is an UVS, the third device may alternatively obtain the moving parameter of the UAV (for example, based on an input of an administrator or reporting of the UAV), and generate the communication coverage request message based on the moving parameter.

The communication coverage request message may include communication coverage area information.

The communication coverage area information may be used to indicate an area for which air coverage needs to be provided.

In an implementation, the communication coverage area information may include the moving parameter.

In another implementation, the communication coverage area information may include information about an area #A.

The area #A is an area for which the air coverage needs to be provided.

The third device may alternatively determine the area #A based on the moving parameter.

For example, the third device may determine a range of the area #A in the horizontal direction based on the horizontal moving range indicated by the parameter A (that is, the moving range). That is, an EMS may enable the area #A to include the horizontal moving range indicated by the parameter A.

For another example, the third device may determine a height of the area #A based on a flight height indicated by the parameter A (that is, the moving range). That is, a first management device may make a difference between the height of the area #A and the height indicated by the parameter A to fall within a preset difference range.

For another example, the third device may determine the area #A based on the parameter B (that is, the destination of the movement), so that the area #A (the range of the area #A in the horizontal direction) includes the destination of the movement of the UAV.

For another example, the first management device may determine the area #A based on the parameter C (that is, the place of departure of the movement), so that the area #A (the range of the area #A in the horizontal direction) includes the place of departure of the movement of the UAV.

For another example, the third device may determine the area #A based on the parameter D (that is, the trajectory), so that the area #A (the range of the area #A in the horizontal direction) includes the passing points on the trajectory of the UAV.

For another example, the third device may deduce the trajectory of the UAV based on the parameter D (that is, the moving direction), the parameter E (the moving speed), and the parameter F (that is, the current position), and further determine the area #A, so that the area #A (the range of the area #A in the horizontal direction) includes the passing points on the trajectory of the UAV.

It may be understood that, in the embodiments, the third device may periodically aggregate moving parameters reported by a plurality of UAVs, and determine the area #A based on the plurality of moving parameters. For example, the area #A may include passing points on a flight route of each of the plurality of UAVs.

In addition, the communication coverage request message may further include communication requirement information.

The communication requirement information may be used to determine a radio parameter of air coverage.

The communication requirement information may include information such as an identifier of air communication, an uplink communication rate, a downlink communication rate, or a communication delay.

Alternatively, the communication requirement information may include the auxiliary information #1.

Optionally, the communication coverage request message may further include communication time information.

The communication time information may be used to determine communication coverage time.

For example, the communication time information may include the auxiliary information #2.

Optionally, the communication coverage request message and the communication request message may be a same message.

For example, the third device may encapsulate the communication request message into information that can be parsed out by a second management device (for example, an NMS).

In other words, the third device may convert the communication request message into information that conforms to a communication protocol between the third device and the second management device.

For another example, in the embodiments, the third device may aggregate communication request messages reported by a plurality of first devices (for example, the plurality of UAVs).

Alternatively, the third device may aggregate a plurality of communication request messages reported by a same first device (for example, the UVS).

In addition, the third device may generate the communication coverage request message based on the plurality of communication request messages.

In this case, a coverage range indicated by the communication coverage area information in the communication coverage request message may include passing points on a flight route of each of the plurality of UAVs.

In addition, a radio parameter (or in other words, an air interface configuration parameter) indicated by communication service requirement information in the communication coverage request message can meet a communication requirement of each of the plurality of UAVs.

In addition, the communication time indicated by the communication time information in the communication coverage request message may include communication time of each of the plurality of UAVs.

By way of example, and not limitation, a frame structure of the communication coverage request message may be similar to a frame structure shown in FIG. 5.

In addition, the third device may send the communication coverage request message to the second management device (for example, the NMS).

Optionally, the second management device may perform authentication on the UAV based on the communication coverage request message (for example, the device identifier of the UAV), and forward the communication coverage request message to the first management device (for example, the EMS) after the authentication succeeds.

Optionally, the second management device may charge the UAV based on the communication coverage request message. For example, the second management device may obtain user subscription information of the UAV, where the user subscription information may indicate a charging policy corresponding to the device identifier of the UAV; and then the second management device may perform charging according to the charging policy.

In S130, the second management device may forward the communication coverage request message to the first management device (for example, the EMS).

In S140, the first management device may determine at least one target access network in a plurality of access networks based on the communication coverage request message.

For example, when the communication coverage request message (the communication coverage area information) includes the moving parameter, the first management device may determine the area #A based on the communication coverage area information.

The area #A is an area for which the air coverage needs to be provided.

For example, the first management device may determine the range of the area #A in the horizontal direction based on the horizontal moving range indicated by the parameter A (that is, the moving range). That is, the EMS may enable the area #A to include the horizontal moving range indicated by the parameter A.

For another example, the first management device may determine the height of the area #A based on the flight height indicated by the parameter A (that is, the moving range). That is, the first management device may make the difference between the height of the area #A and the height indicated by the parameter A fall within the preset difference range.

For another example, the first management device may determine the area #A based on the parameter B (that is, the destination of the movement), so that the area #A (the range of the area #A in the horizontal direction) includes the destination of the movement of the UAV.

For another example, the first management device may determine the area #A based on the parameter C (that is, the place of departure of the movement), so that the area #A (the range of the area #A in the horizontal direction) includes the place of departure of the movement of the UAV.

For another example, the first management device may determine the area #A based on the parameter D (that is, the trajectory), so that the area #A (the range of the area #A in the horizontal direction) includes the passing points on the trajectory of the UAV.

For another example, the first management device may deduce the trajectory of the UAV based on the parameter D (that is, the moving direction), the parameter E (the moving speed), and the parameter F (that is, the current position), and further determine the area #A, so that the area #A (the range of the area #A in the horizontal direction) includes the passing points on the trajectory of the UAV.

It may be understood that, in the embodiments, the first management device may periodically aggregate the moving parameters reported by the plurality of UAVs, and determine the area #A based on the plurality of moving parameters. For example, the area #A may include the passing points on the flight route of each of the plurality of UAVs.

For another example, when the communication coverage request message (the communication coverage area information) includes the information about the area #A, the first management device may directly obtain the information about the area #A from the communication coverage area information.

Then, the first management device may determine a target access device based on the area #A.

By way of example, and not limitation, in the embodiments, the first management device may determine the target access device in any one of the following manners.

For example, the first management device may obtain coverage information (denoted as information #1 below for ease of understanding and description) of a plurality of access devices or cells (of an access device) in a communication system.

The information #1 may be used to indicate a coverage range of the access device or the cell.

For example, in the embodiments, a network element (that is, a third-party device, for example, an OAM) configured to periodically collect the information #1 of each access device or cell may be configured in the communication system, so that in S130, the first management device may obtain the information #1 from the third-party device.

For another example, in the embodiments, the first management device may establish a communication connection to each access device, so that the first management device may obtain the information #1 from the access device.

In this way, the first management device may determine a target access network based on the area #A and the coverage range that is of each access network (for example, the access device or the cell) and that is indicated by the information #1, so that a coverage range of the target access network includes (or in other words, can cover) the area #A.

For another example, the first management device may obtain information (denoted as information #2 below for ease of understanding and description) about an access network set corresponding to a plurality of areas (for example, geographical areas) served by the communication system.

That is, the information #2 may be used to indicate an access network set corresponding to each of the plurality of areas.

An access network set corresponding to an area may include a plurality of access networks whose coverage ranges have an intersection with the area.

For example, a coverage range of an access network corresponding to an area may belong to the area.

Alternatively, a coverage range of an access network corresponding to an area may include the area.

By way of example, and not limitation, the first management device may obtain the information #2 from the third-party device.

Therefore, the first management device may determine, based on the information #2, an access network set corresponding to the area #A, and determine one or more access networks in the access network set corresponding to the area #A as the target access network. Optionally, before the first management device determines the target access device based on the information #1 or the information #2, the first management device may further obtain capability information (denoted as information #3 below for ease of understanding and description) of a plurality of access devices or cells (of an access device).

The information #3 may be used to indicate a communication capability of the access device or the cell.

For example, the communication capability may include a capability (denoted as a capability #1) about whether the air coverage service (that is, the example of the first communication service) can be provided.

In this case, the first management device may first select, based on the information #3 from the plurality of access devices or cells served by the communication system, access devices (denoted as candidate access devices #1) that can provide the air coverage service.

Then, the first management device may determine the target access device in the candidate access devices #1 based on the information #1 or the information #2.

For another example, the communication capability may include a maximum communication rate (denoted as a capability #2) that can be provided.

In this case, the first management device may further determine the communication rate expected by the UAV. For example, the first management device may determine, based on the parameter H, the communication rate expected by the UAV.

Further, the first management device may select, based on the information #3 from the plurality of access devices or cells served by the communication system, access devices (denoted as candidate access devices #2) that can meet the communication rate expected by the UAV.

Then, the first management device may determine the target access device in the candidate access devices #2 based on the information #1 or the information #2.

For another example, the communication capability may include a minimum communication delay (denoted as a capability #3) that can be provided.

In this case, the first management device may further determine the communication delay expected by the UAV.

For example, the first management device may determine, based on the parameter I, the communication delay expected by the UAV.

Further, the first management device may select, based on the information #3 from the plurality of access devices or cells served by the communication system, access devices (denoted as candidate access devices #3) that can meet the communication delay expected by the UAV.

Then, the first management device may determine the target access device in the candidate access devices #3 based on the information #1 or the information #2.

It may be understood that the communication capability may include one or more of the capability #1, the capability #2, and the capability #3, and based on a capability included in the communication capability, a selected candidate access device should meet a requirement on the capability.

In S150, the first management device may send a first configuration message to the target access network (or in other words, an access device that provides the target access network), where the first configuration message may be used to indicate the target access network to enable the air coverage function, or in other words, the first configuration message may be used to indicate the target access network to provide the air coverage service.

In this case, in S160, the target access network (or in other words, the access device that provides the target access network) may provide the air coverage service based on the first configuration message.

Optionally, the first management device may further determine an air interface configuration, and an air interface configuration parameter, of the target access device based on the communication service requirement information.

For example, the first management device may adjust or select the air interface configuration parameter based on the parameter H, so that the communication rate between the access device and the UAV meets (for example, is greater than or equal to) the communication rate expected by the UAV.

For another example, the first management device adjusts or selects the air interface configuration parameter based on the parameter I, so that the communication delay between the access device and the UAV meets (for example, is less than or equal to) the communication delay expected by the UAV.

For another example, the first management device may calculate a distance between the access device and the UAV based on the communication coverage area information, and then adjust or select the air interface configuration parameter based on the distance, so that the communication rate between the access device and the UAV meets the communication rate expected by the UAV, or the communication delay between the access device and the UAV meets the communication delay expected by the UAV.

In this case, the first management device may send, to the target access network, the second configuration message used to indicate the determined air interface configuration parameter.

In this case, the target access network may provide the air coverage based on the first configuration message, and determine the air interface configuration parameter (that is, an example of the communication parameter) of the air coverage based on the second configuration message.

It may be understood that in the embodiments, the first configuration message and the second configuration message may be synchronously sent. In other words, the first configuration message and the second configuration message may be a same message.

Alternatively, the first configuration message and the second configuration message may be carried in different messages or signaling. In other words, the first configuration message and the second configuration message may be asynchronously sent.

It may be understood that in the embodiments, the first management device may periodically aggregate a plurality of pieces of communication service requirement information reported by the second management device, and determine the air interface configuration of the target access device based on the plurality of pieces of communication service requirement information. For example, the first management device may set the air interface configuration of the target access device to meet a communication delay requirement of an UAV that has a highest delay requirement and that is in the plurality of UAVs, or set the air interface configuration of the target access device to meet a communication rate requirement of an UAV that has a highest communication rate requirement and that is in the plurality of UAVs.

Optionally, the first management device may further determine the communication time of the target access network based on the communication time information, and a time period in which the air coverage service is provided.

For example, the first management device may determine, based on the parameter J, the time period in which the UAV is located in the coverage range of the target access network.

For another example, the first management device may calculate, based on the moving parameter, the time period in which the UAV is located in the coverage range of the target access network.

The first management device may send, to the target access network, a third configuration message used to indicate the determined communication time period.

For example, the third configuration message may be used to indicate a start moment and an end moment of the communication time period, or the third configuration message may be used to indicate a start moment and duration of the communication time period.

The target access network may provide the air coverage based on the first configuration message, and determine the communication time period of the air coverage based on the third configuration message.

It may be understood that, in the embodiments, the first configuration message and the third configuration message may be synchronously sent. In other words, the first configuration message and the third configuration message may be a same message.

Alternatively, the first configuration message and the third configuration message may be carried in different messages or signaling. In other words, the first configuration message and the third configuration message may be asynchronously sent.

It may be understood that in the embodiments, the first management device may periodically aggregate a plurality of pieces of communication time information reported by the second management device, and determine the communication time of the target access network based on the plurality of pieces of communication time information. For example, the first management device may determine, based on time at which one of a plurality of UAVs first enters the coverage range of the target access device, a start moment at which the target access device provides the air coverage service, and determine, based on time at which one of the plurality of UAVs finally leaves the coverage range of the target access device, an end moment at which the air coverage service is provided.

Optionally, after receiving the configuration message, the target access network (for example, the access device that provides the target access network) may further send feedback information #1 to the first management device, where the feedback information #1 may be used to indicate that the target access network can provide the air coverage service.

Optionally, the first management device may send feedback information #2 to the second management device, where the feedback information #2 may be used to indicate that control information has been delivered to the access device. In other words, the feedback information #2 may be used to indicate that the communication system can provide the air coverage service for the UAV.

Optionally, the second management device may send feedback information #3 to the third device, where the feedback information #3 may be used to indicate that the communication system may provide the air coverage service for the UAV.

Optionally, the third device may send feedback information #4 to the first device (for example, the UAV or the UVS), where the feedback information #4 may be used to indicate that the communication system may provide the air coverage service for the UAV.

In addition, in the foregoing description, a processing process of the terminal device is described by using the UAV as an example. However, the terminal device in the embodiments is not limited thereto, and the terminal device may be any movable device.

For example, the terminal device may also include a driverless car, or the like. In this case, the air coverage service may be replaced with a ground coverage service.

For another example, the terminal device may also include an unmanned ship, or the like. In this case, the air coverage service may be replaced with an ocean coverage service.

As described above, in the embodiments, the first device may include the UAV or the UVS, the third device may include the UCF, the second management device may include the NMS, and the first management device may include the EMS.

Alternatively, in the embodiments, there may be no first device. In this case, for example, the third device may include the UVS, the second management device may include the NMS, and the first management device may include the EMS.

In a communications technology, to ensure communication coverage of a moving terminal device, the communication coverage function needs to be enabled for all access devices in the communication system. As a result, resources of an access device in a coverage range in which no terminal device arrives are wasted.

In contrast to this, according to the solution provided in the embodiments, the terminal device reports a moving parameter, and a management device determines, based on the moving parameter, a target access device that needs to provide a communication service for the terminal device, and controls the target access device to enable a communication coverage function. This can avoid a meaningless waste of resources of an access device in a coverage range in which no terminal device arrives.

According to the foregoing method, FIG. 6 is a schematic diagram of a wireless communication apparatus 200 according to an embodiment.

The apparatus 200 may be an EMS, or may be a chip or a circuit, for example, a chip or a circuit that may be disposed in the EMS.

The apparatus 200 may include a processing unit 210 (that is, an example of the processing unit) and a storage unit 220. The storage unit 220 is configured to store instructions.

The processing unit 210 is configured to execute the instructions stored in the storage unit 220, to enable the apparatus 200 to implement the steps performed by the EMS in the foregoing method.

Further, the apparatus 200 may further include an input port 230 (that is, an example of a communication unit) and an output port 240 (that is, another example of the communication unit). Further, the processing unit 210, the storage unit 220, the input port 230, and the output port 240 may communicate with each other through an internal connection path, to transmit a control signal and/or a data signal. The storage unit 220 is configured to store a computer program. The processing unit 210 may be configured to invoke the computer program from the storage unit 220 and run the computer program, to control the input port 230 to receive a signal and control the output port 240 to send a signal, to complete the steps performed by the terminal device in the foregoing method. The storage unit 220 may be integrated into the processing unit 210, or may be disposed separately from the processing unit 210.

Optionally, if the apparatus 200 is a communication device (for example, the EMS), the input port 230 is a receiver, and the output port 240 is a transmitter. The receiver and the transmitter may be a same physical entity or different physical entities. When being the same physical entity, the receiver and the transmitter may be collectively referred to as a transceiver.

Optionally, if the apparatus 200 is a chip or a circuit, the input port 230 is an input interface, and the output port 240 is an output interface.

In an implementation, it may be considered that functions of the input port 230 and the output port 240 are implemented by using a transceiver circuit or a dedicated transceiver chip. It may be considered that the processing unit 210 may be implemented by using a dedicated processing chip, a processing circuit, a processing unit, or a general-purpose chip.

In another implementation, it may be considered that the communication device (for example, the EMS) provided in this embodiment may be implemented by using a general-purpose computer. The program code for implementing functions of the processing unit 210, the input port 230, and the output port 240 may be stored in the storage unit 220, and a general-purpose processing unit executes the code in the storage unit 220 to implement the functions of the processing unit 210, the input port 230, and the output port 240.

For example, the processing unit 210 may control the input port 230 to receive service request information from a second management device, where the service request information is used to request a first communication service, and the service request information is used to indicate a target area for which communication coverage needs to be provided. The apparatus 200 is configured in or is a manufacturer-oriented management device, and the second management device includes an operator-oriented management device.

The processing unit 210 may determine a target access device based on mobility parameter service request information, where a coverage range of the target access device includes the target area.

The output port 240 may send first control information to the target access device, where the first control information is used to indicate the target access device to provide the first communication service.

The foregoing listed functions and actions of the modules or units in the apparatus 200 are merely examples for description. The modules or units in the apparatus 200 may be configured to perform actions or processing processes performed by the EMS in the foregoing method. To avoid repetition, detailed descriptions are omitted herein.

For concepts, explanations, detailed descriptions, and other steps of the apparatus 200 that are related to the solutions provided in the embodiments, refer to the descriptions of the content in the foregoing method or other embodiments. Details are not described herein again.

According to the foregoing method, FIG. 7 is a schematic diagram of a wireless communication apparatus 300 according to an embodiment.

The apparatus 300 may be an NMS, or may be a chip or a circuit, for example, a chip or a circuit that may be disposed in the NMS.

The apparatus 300 may include a processing unit 310 (that is, an example of the processing unit) and a storage unit 320. The storage unit 320 is configured to store instructions.

The processing unit 310 is configured to execute the instructions stored in the storage unit 320, to enable the apparatus 300 to implement the steps performed by the NMS in the foregoing method.

Further, the apparatus 300 may further include an input port 330 (that is, an example of a communication unit) and an output port 340 (that is, another example of the communication unit). Further, the processing unit 310, the storage unit 320, the input port 330, and the output port 340 may communicate with each other through an internal connection path, to transmit a control signal and/or a data signal. The storage unit 320 is configured to store a computer program. The processing unit 310 may be configured to invoke the computer program from the storage unit 320 and run the computer program, to control the input port 330 to receive a signal and control the output port 340 to send a signal, to complete the steps performed by the terminal device in the foregoing method. The storage unit 320 may be integrated into the processing unit 310, or may be disposed separately from the processing unit 310.

Optionally, if the apparatus 300 is a communication device (for example, the NMS), the input port 330 is a receiver, and the output port 340 is a transmitter. The receiver and the transmitter may be a same physical entity or different physical entities. When being the same physical entity, the receiver and the transmitter may be collectively referred to as a transceiver.

Optionally, if the apparatus 300 is a chip or a circuit, the input port 330 is an input interface, and the output port 340 is an output interface.

In an implementation, it may be considered that functions of the input port 330 and the output port 340 are implemented by using a transceiver circuit or a dedicated transceiver chip. It may be considered that the processing unit 310 may be implemented by using a dedicated processing chip, a processing circuit, a processing unit, or a general-purpose chip.

In another implementation, it may be considered that the communication device (for example, the NMS) provided in this embodiment may be implemented by using a general-purpose computer. The program code for implementing functions of the processing unit 310, the input port 330, and the output port 340 may be stored in the storage unit 320, and a general-purpose processing unit executes the code in the storage unit 320 to implement the functions of the processing unit 310, the input port 330, and the output port 340.

For example, the processing unit 310 may control the input port 330 to receive service request information from a third management device, where the service request information is used to request a first communication service, and the service request information is used to indicate a target area for which communication coverage needs to be provided. The apparatus 300 is configured in or is an operator-oriented management device, and the third management device is a management device of the first communication service.

The output port 340 is configured to forward the service request information to a first management device, where the first management device includes a manufacturer-oriented management device.

The foregoing listed functions and actions of the modules or units in the apparatus 300 are merely examples for description. The modules or units in the apparatus 300 may be configured to perform actions or processing processes performed by the NMS in the foregoing method. To avoid repetition, detailed descriptions are omitted herein.

For concepts, explanations, detailed descriptions, and other steps of the apparatus 300 that are related to the solutions provided in the embodiments, refer to the descriptions of the content in the foregoing method or other embodiments. Details are not described herein again.

Figure 8:
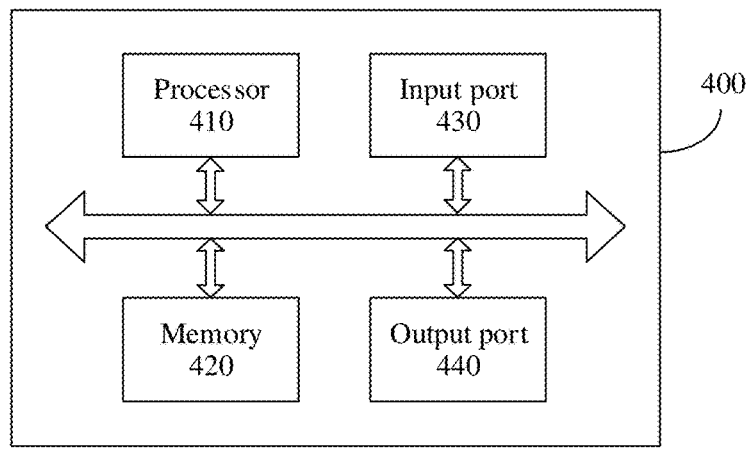
FIG. 8 is a schematic structural diagram of still another example of a wireless communication apparatus according to an embodiment.

According to the foregoing method, FIG. 8 is a schematic diagram of a wireless communication apparatus 400 according to an embodiment.

The apparatus 400 may be a UCF, or may be a chip or a circuit, for example, a chip or a circuit that may be disposed in the UCF.

The apparatus 400 may include a processing unit 410 (that is, an example of the processing unit) and a storage unit 420. The storage unit 420 is configured to store instructions.

The processing unit 410 is configured to execute the instructions stored in the storage unit 420, to enable the apparatus 400 to implement the steps performed by the UCF in the foregoing method.

Further, the apparatus 400 may further include an input port 440 (that is, an example of a communication unit) and an output port 440 (that is, another example of the communication unit). Further, the processing unit 410, the storage unit 420, the input port 430, and the output port 440 may communicate with each other through an internal connection path, to transmit a control signal and/or a data signal. The storage unit 420 is configured to store a computer program. The processing unit 410 may be configured to invoke the computer program from the storage unit 420 and run the computer program, to control the input port 430 to receive a signal and control the output port 440 to send a signal, to complete the steps performed by the terminal device in the foregoing method. The storage unit 420 may be integrated into the processing unit 410, or may be disposed separately from the processing unit 410.

Optionally, if the apparatus 400 is a communication device (for example, the UCF), the input port 430 is a receiver, and the output port 440 is a transmitter. The receiver and the transmitter may be a same physical entity or different physical entities. When being the same physical entity, the receiver and the transmitter may be collectively referred to as a transceiver.

Optionally, if the apparatus 400 is a chip or a circuit, the input port 430 is an input interface, and the output port 440 is an output interface.

In an implementation, it may be considered that functions of the input port 430 and the output port 440 are implemented by using a transceiver circuit or a dedicated transceiver chip. It may be considered that the processing unit 410 may be implemented by using a dedicated processing chip, a processing circuit, a processing unit, or a general-purpose chip.

In another implementation, it may be considered that the communication device (for example, the UCF) provided in this embodiment may be implemented by using a general-purpose computer. The program code for implementing functions of the processing unit 410, the input port 430, and the output port 440 may be stored in the storage unit 420, and a general-purpose processing unit executes the code in the storage unit 420 to implement the functions of the processing unit 410, the input port 430, and the output port 440.

For example, the processing unit 410 may control the input port 430 to receive communication request information, where the communication request information is used to request a first communication service, and the communication request information is used to indicate at least one passing point on a trajectory of a terminal device. The apparatus 400 is configured in or is a management device of the first communication service.

The processing unit 410 is configured to generate service request information based on the communication request information, where the service request information is used to request the first communication service, the service request information is used to indicate a target area, and the target area includes the at least one passing point.

The output port 440 is configured to send the service request information to a second management device, where the second management device includes an operator-oriented management device.

The foregoing listed functions and actions of the modules or units in the apparatus 400 are merely examples for description. The modules or units in the apparatus 400 may be configured to perform actions or processing processes performed by the UCF in the foregoing method. To avoid repetition, detailed descriptions are omitted herein.

For concepts, explanations, detailed descriptions, and other steps of the apparatus 400 that are related to the solutions provided in the embodiments, refer to the descriptions of the content in the foregoing method or other embodiments. Details are not described herein again.

Figure 9:
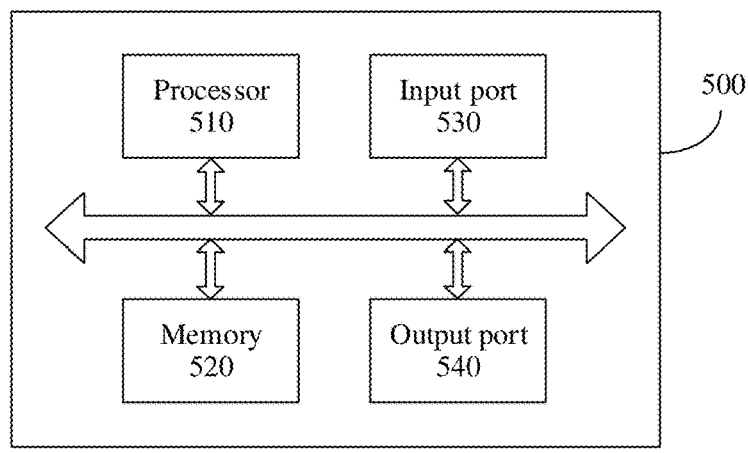
FIG. 9 is a schematic structural diagram of still another example of a wireless communication apparatus according to an embodiment.

According to the foregoing method, FIG. 9 is a schematic diagram of a wireless communication apparatus 500 according to an embodiment.

The apparatus 500 may be an access device, or may be a chip or a circuit, for example, a chip or a circuit that may be disposed in the access device.

The apparatus 500 may include a processing unit 510 (that is, an example of the processing unit) and a storage unit 520. The storage unit 520 is configured to store instructions.

The processing unit 510 is configured to execute the instructions stored in the storage unit 520, to enable the apparatus 500 to implement the steps performed by the access device (for example, the target access device) in the foregoing method.

Further, the apparatus 500 may further include an input port 540 (that is, an example of a communication unit) and an output port 540 (that is, another example of the communication unit). Further, the processing unit 510, the storage unit 520, the input port 530, and the output port 540 may communicate with each other through an internal connection path, to transmit a control signal and/or a data signal. The storage unit 520 is configured to store a computer program. The processing unit 510 may be configured to invoke the computer program from the storage unit 520 and run the computer program, to control the input port 530 to receive a signal and control the output port 540 to send a signal, to complete the steps performed by the terminal device in the foregoing method. The storage unit 520 may be integrated into the processing unit 510, or may be disposed separately from the processing unit 510.

Optionally, if the apparatus 500 is a communication device (for example, the target access device), the input port 530 is a receiver, and the output port 540 is a transmitter. The receiver and the transmitter may be a same physical entity or different physical entities. When being the same physical entity, the receiver and the transmitter may be collectively referred to as a transceiver.

Optionally, if the apparatus 500 is a chip or a circuit, the input port 530 is an input interface and the output port 540 is an output interface.

In an implementation, it may be considered that functions of the input port 530 and the output port 540 are implemented by using a transceiver circuit or a dedicated transceiver chip. It may be considered that the processing unit 510 may be implemented by using a dedicated processing chip, a processing circuit, a processing unit, or a general-purpose chip.

In another implementation, it may be considered that the communication device (for example, the target access device) provided in this embodiment may be implemented by using a general-purpose computer. The program code for implementing functions of the processing unit 510, the input port 530, and the output port 540 may be stored in the storage unit 520, and a general-purpose processing unit executes the code in the storage unit 520 to implement the functions of the processing unit 510, the input port 530, and the output port 540.

For example, the processing unit 510 may control the input port 530 to receive first control information sent by a first management device, where the first control information is used to indicate the target access device to provide a first communication service, the target access device is located in a target area, the target area is determined by the first management device based on service request information, the service request information is used to request the first communication service, and the service request information is used to indicate the target area.

The processing unit 510 is configured to provide the first communication service based on the first control information.

The foregoing listed functions and actions of the modules or units in the apparatus 500 are merely examples for description. The modules or units in the apparatus 500 may be configured to perform actions or processing processes performed by the target access device in the foregoing method. To avoid repetition, detailed descriptions are omitted herein.

For concepts, explanations, detailed descriptions, and other steps of the apparatus 500 that are related to the solutions provided in the embodiments, refer to the descriptions of the content in the foregoing method or other embodiments. Details are not described herein again.

Figure 10:
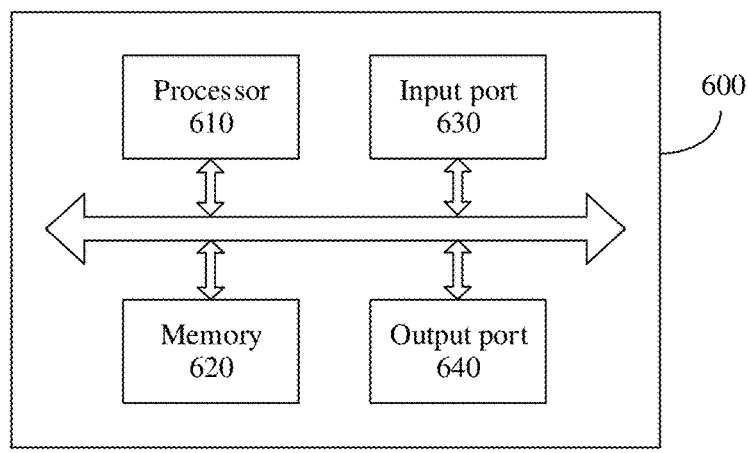
FIG. 10 is a schematic structural diagram of still another example of a wireless communication apparatus according to an embodiment.

According to the foregoing method, FIG. 10 is a schematic diagram of a wireless communication apparatus 600 according to an embodiment.

The apparatus 600 may be a terminal device (for example, an UAV or a remote controller of the UAV), or may be a chip or a circuit, for example, a chip or a circuit that may be disposed in the terminal device.

The apparatus 600 may include a processing unit 610 (that is, an example of the processing unit) and a storage unit 620. The storage unit 620 is configured to store instructions.

The processing unit 610 is configured to execute the instructions stored in the storage unit 620, to enable the apparatus 600 to implement the steps performed by the terminal device (for example, the UAV) in the foregoing method.

Further, the apparatus 600 may further include an input port 630 (that is, an example of a communication unit) and an output port 640 (that is, another example of the communication unit). Further, the processing unit 610, the storage unit 620, the input port 630, and the output port 640 may communicate with each other through an internal connection path, to transmit a control signal and/or a data signal. The storage unit 620 is configured to store a computer program. The processing unit 610 may be configured to invoke the computer program from the storage unit 620 and run the computer program, to control the input port 630 to receive a signal and control the output port 640 to send a signal, to complete the steps performed by the terminal device (for example, the UAV) in the foregoing method. The storage unit 620 may be integrated into the processing unit 610, or may be disposed separately from the processing unit 610.

Optionally, if the apparatus 600 is a communication device (for example, the terminal device), the input port 630 is a receiver, and the output port 640 is a transmitter. The receiver and the transmitter may be a same physical entity or different physical entities. When being the same physical entity, the receiver and the transmitter may be collectively referred to as a transceiver.

Optionally, if the apparatus 600 is a chip or a circuit, the input port 630 is an input interface and the output port 640 is an output interface.

In an implementation, it may be considered that functions of the input port 630 and the output port 640 are implemented by using a transceiver circuit or a dedicated transceiver chip. It may be considered that the processing unit 610 may be implemented by using a dedicated processing chip, a processing circuit, a processing unit, or a general-purpose chip.

In another implementation, it may be considered that the communication device (for example, the UAV device) provided in this embodiment may be implemented by using a general-purpose computer. The program code for implementing functions of the processing unit 610, the input port 630, and the output port 640 may be stored in the storage unit 620, and a general-purpose processing unit executes the code in the storage unit 620 to implement the functions of the processing unit 610, the input port 630, and the output port 640.

In an implementation, the processing unit 610 may generate communication request information, where the wireless communication apparatus includes a terminal device or a control device of the terminal device, the communication request information is used to request a first communication service, and the communication request information is used to indicate at least one passing point on a trajectory of the terminal device.

The output port 640 is configured to send the communication request information to a third management device, where the third management device is a management device of the first communication service.

The foregoing listed functions and actions of the modules or units in the apparatus 600 are merely examples for description. The modules or units in the apparatus 600 may be configured to perform actions or processing processes performed by the terminal device (for example, the UAV) in the foregoing method. To avoid repetition, detailed descriptions are omitted herein.

For concepts, explanations, detailed descriptions, and other steps of the apparatus 600 that are related to the solutions provided in the embodiments, refer to the descriptions of the content in the foregoing method or other embodiments. Details are not described herein again.

Figure 11:
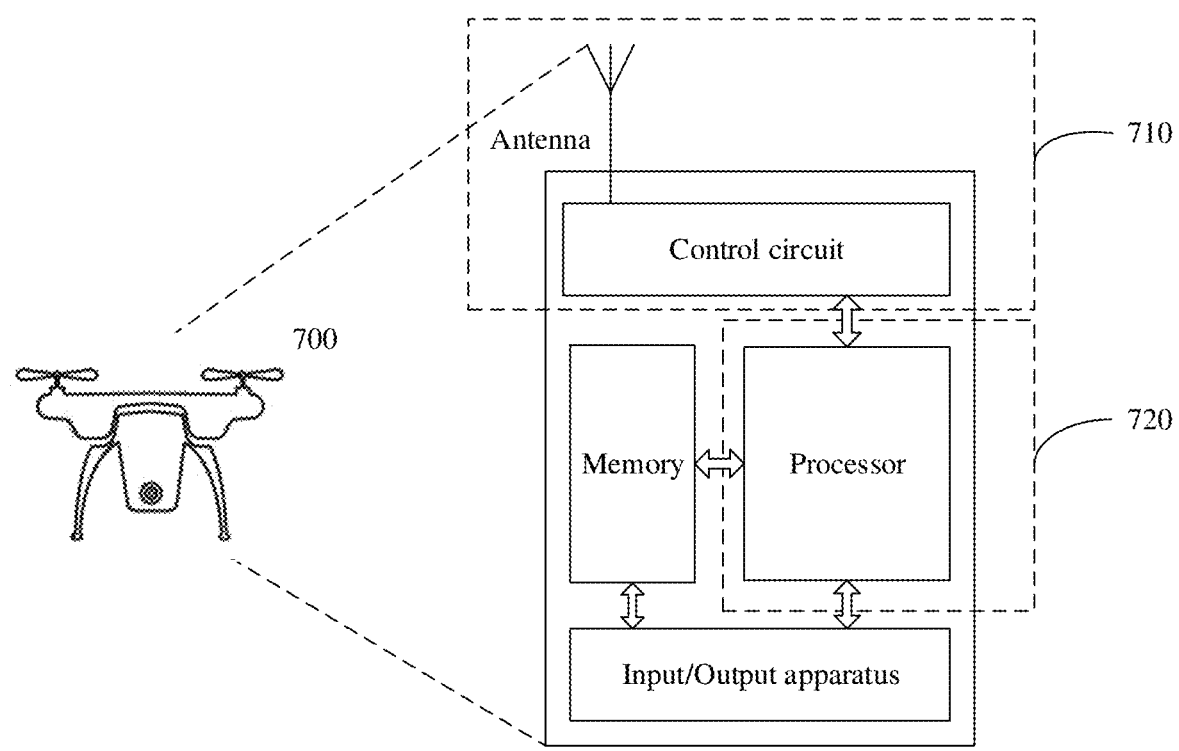
FIG. 11 is a schematic structural diagram of an example of an UAV according to an embodiment.

FIG. 11 is a schematic structural diagram of a terminal device 700 according to the embodiments. The apparatus 600 may be configured in the terminal device 700, or the apparatus 600 may be the terminal device 700. In other words, the terminal device 700 may perform the actions performed by the terminal device (for example, the UAV) in the foregoing method 100.

For ease of description, FIG. 11 shows only main components of the terminal device. As shown in FIG. 11, the terminal device 700 includes a processor, a memory, a control circuit, an antenna, and an input/output apparatus.

The processor is mainly configured to: process a communication protocol and communication data, control the entire terminal device, execute a software program, and process data of the software program, for example, is configured to support the terminal device in performing the actions described in the foregoing embodiment of the wireless communication method. The memory is mainly configured to store the software program and the data. The control circuit is mainly configured to: perform conversion between a baseband signal and a radio frequency signal, and process the radio frequency signal. A combination of the control circuit and the antenna may also be referred to as a transceiver that is mainly configured to receive/send a radio frequency signal in an electromagnetic wave form. The input/output apparatus such as a touchscreen, a display, or a keyboard is mainly configured to receive data entered by a user and output data to the user.

After the terminal device is powered on, the processor may read the software program in the storage unit, explain and execute instructions of the software program, and process the data of the software program. When data needs to be sent in a wireless manner, after performing baseband processing on the to-be-sent data, the processor outputs a baseband signal to a radio frequency circuit. After performing radio frequency processing on the baseband signal, the radio frequency circuit sends a radio frequency signal to the outside through the antenna in an electromagnetic wave form. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data.

A person of ordinary skill in the art may understand that for ease of description, FIG. 11 shows only one memory and only one processor. An actual terminal device may have a plurality of processors and a plurality of memories. The memory may also be referred to as a storage medium, a storage device, or the like. This is not limited in the embodiments.

For example, the processor may include a baseband processor and a CPU. The baseband processor is mainly configured to process the communication protocol and the communication data. The CPU is mainly configured to control the entire terminal device, execute the software program, and process the data of the software program. The processor in FIG. 11 is integrated with functions of the baseband processor and the central processing unit. A person of ordinary skill in the art may understand that the baseband processor and the CPU may alternatively be independent processors, and are interconnected by using a technology such as a bus. A person of ordinary skill in the art may understand that the terminal device may include a plurality of baseband processors to adapt to different network standards, the terminal device may include a plurality of central processing units to improve a processing capability of the terminal device, and components of the terminal device may be connected through various buses. The baseband processor may also be expressed as a baseband processing circuit or a baseband processing chip. The central processing unit may also be expressed as a central processing circuit or a central processing chip. A function of processing the communication protocol and the communication data may be embedded into the processor, or may be stored in the storage unit in a form of a software program, so that the processor executes the software program to implement a baseband processing function.

For example, in this embodiment, the antenna and the control circuit that have receiving and sending functions may be considered as a transceiver unit 710 of the terminal device 700, and the processor having a processing function may be considered as a processing unit 720 of the terminal device 700. As shown in FIG. 11, the terminal device 700 includes the transceiver unit 710 and the processing unit 720. The transceiver unit may also be referred to as a transceiver, a transceiver machine, a transceiver apparatus, or the like. Optionally, a component that is in the transceiver unit 710 and that is configured to implement a receiving function may be considered as a receiving unit, and a component that is in the transceiver unit 710 and that is configured to implement a sending function may be considered as a sending unit. In other words, the transceiver unit includes the receiving unit and the sending unit. For example, the receiving unit may also be referred to as a receiver machine, a receiver, a receive circuit, or the like, and the sending unit may be referred to as a transmitter machine, a transmitter, a transmit circuit, or the like.

Figure 12:
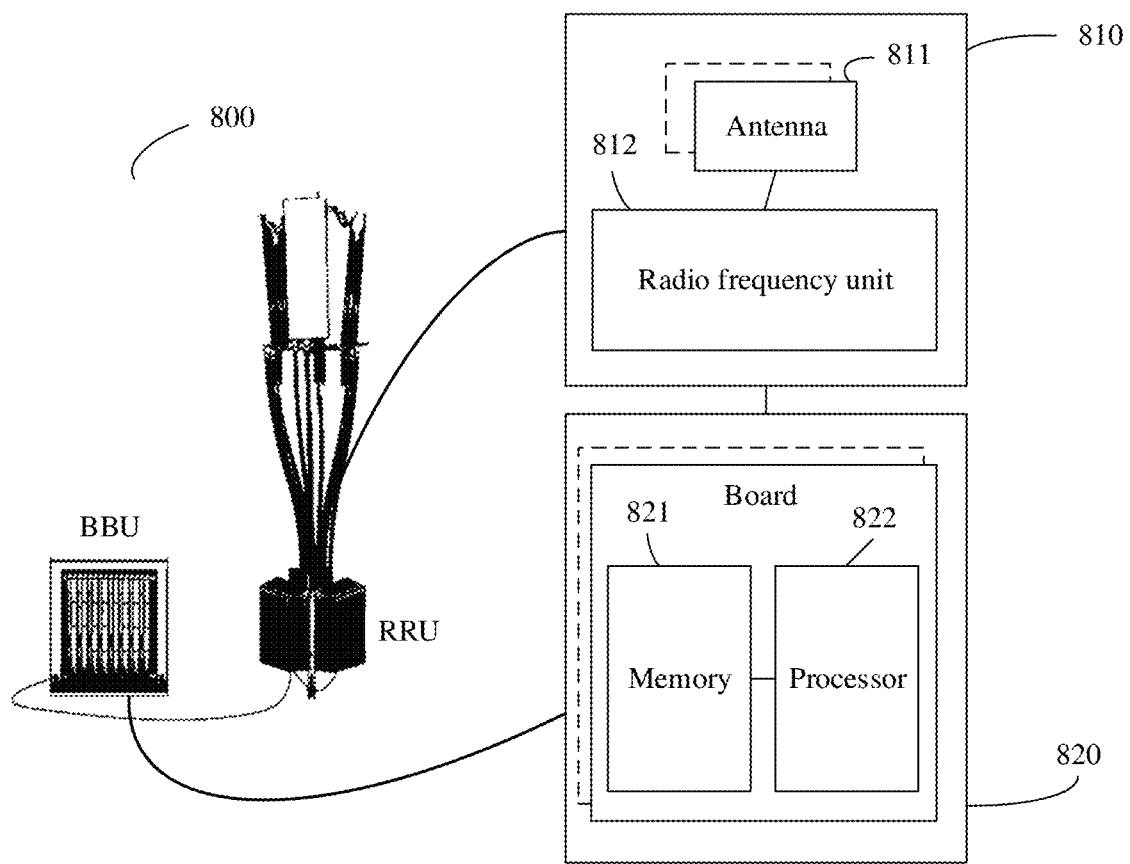
FIG. 12 is a schematic structural diagram of an example of an access device according to an embodiment.

FIG. 12 is a schematic structural diagram of an access device 800 according to an embodiment. The access device 800 may be configured to implement functions of the access device (for example, the target access device) in the foregoing method. The access device 800 includes one or more radio frequency units, such as a remote radio unit (RRU) 810 and one or more baseband units (BBU) (which may also be referred to as digital units) 820. The RRU 810 may be referred to as a transceiver unit, a transceiver machine, a transceiver circuit, a transceiver, or the like, and may include at least one antenna 811 and a radio frequency unit 812. The RRU 810 part is mainly configured to: send and receive a radio frequency signal and perform conversion between a radio frequency signal and a baseband signal, for example, is configured to send the signaling message described in the foregoing embodiment to a terminal device. The BBU 820 is mainly configured to: perform baseband processing, control a base station, and the like. The RRU 810 and the BBU 820 may be physically disposed together, or may be physically separated, that is, in a distributed base station.

The BBU 820 is a control center of the base station, may also be referred to as a processing unit, and is mainly configured to implement a baseband processing function such as channel encoding, multiplexing, modulation, or spreading. For example, the BBU (the processing unit) 820 may be configured to control a base station 40 to perform the operation procedure related to the network device in the foregoing method embodiment.

In an example, the BBU 820 may include one or more boards, and a plurality of boards may jointly support a radio access network (such as an LTE system or a 5G system) of a single access standard, or may separately support radio access networks of different access standards. The BBU 820 further includes a memory 821 and a processor 822. The memory 821 is configured to store necessary instructions and data. For example, the memory 821 stores the codebook and the like in the foregoing embodiments. The processor 822 is configured to control the base station to perform a necessary action, for example, is configured to control the base station to perform the operation procedure related to the network device in the foregoing method embodiment. The memory 821 and the processor 822 may serve one or more boards. In other words, a memory and a processor may be independently disposed on each board, or a same memory and a same processor may be shared on the plurality of boards. In addition, a necessary circuit may be further disposed on each board.

In a possible implementation, with development of a system-on-a-chip (SoC) technology, all or some functions of the part 820 and the part 810 may be implemented by using the SoC technology, for example, implemented through a base station function chip. The base station function chip integrates components such as a processor, a memory, and an antenna port. A program of a base station-related function is stored in the memory. The processor executes the program to implement the base station-related function. Optionally, the base station function chip may also read a memory outside the chip to implement the base station-related function.

It may be understood that the structure of the network device shown in FIG. 12 is merely a possible form, but should not constitute any limitation on the embodiments. In the embodiments, there may be a base station structure in another form in the future.

According to the methods provided in the embodiments, an embodiment may further provide a communication system, including the foregoing access device and one or more terminal devices.

It may be understood that, the processor in the embodiments may be a CPU, or may further be another general-purpose processor, a digital signal processor (DSP), an application-specific integrated circuit (ASIC), a field programmable gate array (FPGA) or another programmable logic device, discrete gate or transistor logic device, discrete hardware component, or the like. The general-purpose processor may be a microprocessor, or the processor may be any conventional processor or the like.

It may be further understood that the memory in the embodiments may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) that is used as an external buffer. Through example but not limitative description, many forms of random access memories (RAM) may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

All or some of the foregoing embodiments may be implemented by using software, hardware, firmware, or any other combination thereof. When the software is used to implement the embodiments, all or some of the foregoing embodiments may be implemented in a form of a computer program product. The computer program product includes one or more computer instructions or computer programs. When the computer instructions or the computer programs are loaded or executed on a computer, the procedure or functions according to the embodiments are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It may be understood that the term "and/or" describes only an association relationship for describing associated objects and represents that three relationships may exist. For example, A and/or B may represent the following three cases: Only A exists, both A and B exist, and only B exists. In addition, the character "/" generally indicates an "or" relationship between the associated objects.

It may be understood that sequence numbers of the foregoing processes do not mean execution sequences in various embodiments. The execution sequences of the processes should be determined based on functions and internal logic of the processes, and should not be construed as any limitation on the implementation processes of the embodiments.

A person of ordinary skill in the art may be aware that units, algorithms, and steps in the examples described with reference to the embodiments disclosed in the embodiments can be implemented by electronic hardware or a combination of computer software and electronic hardware. Whether the functions are performed by hardware or software depends on particular applications and design constraints of the solutions. A person of ordinary skill in the art may use different methods to implement the described functions for each particular application, but it should not be considered that the implementation goes beyond the scope of the embodiments. It may be clearly understood by a person of ordinary skill in the art that, for the purpose of convenient and brief description, for a detailed working process of the foregoing system, apparatus, and unit, refer to a corresponding process in the foregoing method embodiment, and details are not described herein again. In the several embodiments provided, it may be understood that the disclosed system, apparatuses, and methods may be implemented in other manners. For example, the foregoing apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate components may or may not be physically separate, and components displayed as units may or may not be physical units. The components may be located at one position, or may be distributed on a plurality of network units. Some or all of the units may be selected based on an actual requirement to achieve an objective of the solutions of the embodiments. In addition, functional units in the embodiments may be integrated into one processing unit, or each of the units may exist alone physically, or two or more units are integrated into one unit. When the functions are implemented in a form of a software functional unit and sold or used as an independent product, the functions may be stored in a computer readable storage medium. Based on such an understanding, the solutions of this application essentially, or the part contributing to the prior art, or some of the solutions may be implemented in a form of a software product. The computer software product is stored in a storage medium, and includes several instructions for instructing a computer device (which may be a personal computer, a server, or a network device) to perform all or some of the steps of the methods described in the embodiments. The foregoing storage medium includes: any medium that can store program code, for example a USB flash drive, a removable hard disk, a ROM, a RAM, a magnetic disk, or an optical disc.

The foregoing descriptions are merely implementations of the embodiments, but are not intended to limit the protection scope of this application. Any variation or replacement readily figured out by a person of ordinary skill in the art within the scope disclosed in this application shall fall within the protection scope of this application. Therefore, the protection scope of this application shall be subject to the protection scope of the claims.

What is claimed is:

1. A wireless communication method, comprising:
receiving, by a first management device, a communication coverage request message from a second management device, wherein the communication coverage request message comprises at least one of the following communication parameter information: communication coverage area information and communication service requirement information;
determining, by the first management device, at least one target access network based on the communication parameter information; and
sending, by the first management device, a first configuration message to the target access network, wherein the first configuration message is used to indicate the target access network to provide communication coverage.

2. The method according to claim 1, wherein the determining, by the first management device, of at least one target access network based on the communication parameter information comprises:
obtaining, by the first management device, first network information, wherein the first network information is used to indicate an access network corresponding to at least one geographical area; and determining, by the first management device, the at least one target access network based on the first network information and the communication parameter information.

3. The method according to claim 1, further comprising:
determining, by the first management device based on the communication parameter information, a radio parameter corresponding to the communication coverage of the target access network; and
sending, by the first management device, a second configuration message to the target access network, wherein the second configuration message is used to indicate the radio parameter.

4. The method according to claim 1, wherein the communication parameter information further comprises communication time information, and
the method further comprises:
determining, by the first management device based on the communication parameter information, communication time corresponding to the communication coverage of the target access network; and
sending, by the first management device, a third configuration message to the target access network, wherein the third configuration message is used to indicate the communication time.

5. The method according to claim 1, wherein the communication coverage provided by the target access network is air communication coverage, the first management device comprises an element management system (EMS) device, and the second management device comprises a network management system (NMS) device.

6. A wireless communication method, comprising:
receiving, by a second management device, a communication coverage request message from a third device comprising a request for air communication coverage for a first device different from the third device, wherein the communication coverage request message comprises at least one of the following communication parameter information: communication coverage area information and communication service requirement information; and
forwarding, by the second management device, the communication coverage request message to a first management device.

7. The method according to claim 6, wherein the communication parameter information further comprises communication time information.

8. The method according to claim 6, wherein the first management device comprises an element management system (EMS) device, the second management device comprises a network management system (NMS) device, and the third device comprises an unmanned aerial vehicle control function (UCF) device or an unmanned aerial vehicle server.

9. A wireless communication apparatus, comprising a transceiver, a memory, and a processor, wherein
the transceiver is used by the apparatus to perform communication;
the memory is configured to store a computer program; and
the processor is configured to invoke the computer program from the memory and run the computer program to:
receive a communication coverage request message from a second management device, wherein the communication coverage request message comprises at least one of the following communication parameter information: communication coverage area information and communication service requirement information;
determine at least one target access network based on the communication parameter information; and
send a first configuration message to the target access network, wherein the first configuration message is used to indicate the target access network to provide communication coverage.

10. The apparatus according to claim 9, wherein the processor is further configured to invoke the computer program from the memory and run the computer program to:
obtain first network information, wherein the first network information is used to indicate an access network corresponding to at least one geographical area; and
determine the at least one target access network based on the first network information and the communication parameter information.

11. The apparatus according to claim 9, wherein the processor is further configured to invoke the computer program from the memory and run the computer program to:
determine, based on the communication parameter information, a radio parameter corresponding to the communication coverage of the target access network; and
send a second configuration message to the target access network, wherein the second configuration message is used to indicate the radio parameter.

12. The apparatus according to claim 9, wherein the communication parameter information further comprises communication time information, and
the processor is further configured to invoke the computer program from the memory and run the computer program to:
determine, based on the communication parameter information, communication time corresponding to the communication coverage of the target access network; and
send a third configuration message to the target access network, wherein the third configuration message is used to indicate the communication time.

13. The apparatus according to claim 9, wherein the communication coverage provided by the target access network is air communication coverage, the first management device comprises an element management system (EMS) device, and the second management device comprises a network management system (NMS) device.

14. A wireless communication apparatus, comprising a transceiver, a memory, and a processor, wherein
the transceiver is used by the apparatus to perform communication;
the memory is configured to store a computer program; and
the processor is configured to invoke the computer program from the memory and run the computer program to:
receive a communication coverage request message from a third device comprising a request for air communication coverage for a first device different from the third device, wherein the communication coverage request message comprises at least one of the following communication parameter information: communication coverage area information and communication service requirement information; and
forward the communication coverage request message to a first management device.

15. The apparatus according to claim 14, wherein the communication parameter information further comprises communication time information.

16. The apparatus according to claim 14, wherein the first management device comprises an element management system (EMS) device, the second management device comprises a network management system (NMS) device, and the third device comprises an unmanned aerial vehicle control function (UCF) device or an unmanned aerial vehicle server.

* * * * *